US012625441B2

(12) United States Patent
Kubo et al.

(10) Patent No.: US 12,625,441 B2
(45) Date of Patent: May 12, 2026

(54) ELECTROSTATIC CHARGE IMAGE DEVELOPING TONER AND IMAGE FORMING METHOD

(71) Applicant: Konica Minolta, Inc., Tokyo (JP)

(72) Inventors: Yuya Kubo, Hino (JP); Takanari Kayamori, Kawasaki (JP); Naoya Tonegawa, Sagamihara (JP); Noboru Ueda, Mitaka (JP)

(73) Assignee: KONICA MINOLTA, INC., Tokyo (JP)

( * ) Notice: Subject to any disclaimer, the term of this patent is extended or adjusted under 35 U.S.C. 154(b) by 671 days.

(21) Appl. No.: 17/726,159

(22) Filed: Apr. 21, 2022

(65) Prior Publication Data

US 2022/0350269 A1 Nov. 3, 2022

(30) Foreign Application Priority Data

Apr. 30, 2021 (JP) ................................ 2021-077557

(51) Int. Cl.
*G03G 9/083* (2006.01)
*G03G 9/087* (2006.01)

(52) U.S. Cl.
CPC ......... *G03G 9/0834* (2013.01); *G03G 9/0837* (2013.01); *G03G 9/0838* (2013.01); *G03G 9/08755* (2013.01)

(58) Field of Classification Search
CPC .. G03G 9/0834; G03G 9/0837; G03G 9/0838; G03G 9/08755
See application file for complete search history.

(56) References Cited

U.S. PATENT DOCUMENTS

2018/0267416 A1* 9/2018 Uchino .............. G03G 9/08797
2020/0096888 A1* 3/2020 Anno ................... G03G 9/0839
2020/0103774 A1* 4/2020 Fukudome ......... G03G 9/08795

FOREIGN PATENT DOCUMENTS

JP 2018-155912 A 10/2018
JP 2019028239 A 2/2019
JP 2020056920 A 4/2020

OTHER PUBLICATIONS

Office Action issued on Oct. 15, 2024 for the related Japanese patent application No. 2021-077557, with English translation, 5 pages.

* cited by examiner

*Primary Examiner* — Mark F. Huff
*Assistant Examiner* — Boone Alexander Evans
(74) *Attorney, Agent, or Firm* — LUCAS & MERCANTI, LLP

(57) ABSTRACT

Disclosed is an electrostatic charge image developing toner including: toner base particles containing at least a binder resin and a magnetic material; and an external additive, wherein the binder resin contains a crystalline resin; and the external additive contains strontium titanate particles doped with metal elements other than titanium and strontium.

10 Claims, 1 Drawing Sheet

ELECTROSTATIC CHARGE IMAGE DEVELOPING TONER AND IMAGE FORMING METHOD

CROSS-REFERENCE TO RELATED APPLICATIONS

The entire disclosure of Japanese Patent Application No. 2021-077557 filed on Apr. 30, 2021 is incorporated herein by reference in its entirety.

BACKGROUND

Technological Field

The present invention relates to an electrostatic charge image developing toner and an image forming method. More specifically, the present invention relates to an electrostatic charge image developing toner having improved low-temperature fixability, fog suppression and durability.

Description of the Related Art

In image forming devices such as electrophotographic devices, electrostatic recording devices, and electrostatic printing devices, a method of forming a desired image by developing an electrostatic charge image formed on a photoreceptor with a toner is widely implemented. It has been applied to copiers, printers, facsimiles, and multifunction devices thereof. Such toner is called an electrostatic charge image developing toner. In the following, it is also simply referred to as a “toner”.

For example, in an electrophotographic apparatus using an electrophotographic method, in general, the surface of a photoreceptor made of a photoconductive substance is uniformly charged by various means, and then an electrostatic charge image is formed on the photoreceptor. Next, the static charge image is developed with a toner, the toner image is transferred to a recording material such as paper, and then the toner image is fixed by heating to obtain a copy.

As a developer used in an image forming apparatus, a one-component developer containing only a toner, and a two-component developer in which a toner and a carrier are mixed are known.

In recent years, image forming apparatus has been required to be miniaturized and energy saving in addition to high quality, and it is effective to use a one-component developer for miniaturization. Further, for higher quality, it is effective to perform image formation by a one-component contact development method, which is a development method in which a toner carrier and an electrostatic charge image carrier are contact-arranged (contact arrangement). However, in the one-component contact developing method, a large pressure is applied to the contact portion, so that high durability and high transportability of the toner are required in order to obtain a high quality image. Further, for energy saving, it is effective to improve the low-temperature fixability of the toner.

As for the high transportability of the toner, a magnetic toner containing a magnetic material is known. However, in general, since most of the magnetic materials have low electric resistance, the charge amount of the magnetic toner tends to decrease (charge attenuation) in the developing process. Therefore, it is preferable to use a high resistance external additive for the purpose of preventing charge attenuation. Strontium titanate is known as such an external additive, but strontium titanate particles tend to take the shape of a cube or a rectangular parallelepiped due to their high crystallinity, and it is difficult adhere to the surface of the toner base particles described later.

Therefore, as a technique for forming strontium titanate into a shape that easily adheres to the surface of toner base particles, in Patent Document 1 (JP-A 2019-28239), strontium titanate is doped with metal elements other than titanium and strontium. Thereby, a technique for reducing the crystallinity, forming a rounded shape, and making the diameter small and having a high circularity is disclosed. Although the charge attenuation of the toner is suppressed by this technique, the magnetic toner has a problem that the low-temperature fixability is insufficient because the magnetic material penetrates between the binder resins and functions as a filler, and it is required to improve the low-temperature fixability.

Patent Document 2 (JP-A 2020-56920) discloses a technique for introducing a crystalline polyester into a binder resin which is a component of the toner as a method for improving the low-temperature fixability of the magnetic toner. However, crystalline polyester exudes to the surface of the toner base particles in a high temperature and high humidity environment and softens the vicinity of the surface, so that the magnetic material is newly exposed on the surface and charge attenuation occurs, causing fog. There was also a problem that the external additive was buried, and there was room for further improvement in the durability of the toner.

SUMMARY

The present invention has been made in view of the above problems and situations, and a solution thereof is to provide an electrostatic charge image developing toner and an image forming method having improved low-temperature fixability, fog suppression and durability.

The present inventor has found the following as a result of examining the causes of the above problems in order to solve the above problems in the magnetic toner. It was possible to improve low-temperature fixability by incorporating a crystalline resin in the binder resin in the toner base particles, and impregnating the external additive with strontium titanate particles doped with metal elements other than titanium and strontium. As a result, the present inventors have found that fog suppression and durability were improved, and have reached the present invention. That is, the above-mentioned problem according to the present invention is solved by the following means.

To achieve at least one of the above-mentioned objects of the present invention, an electrostatic charge image developing toner that reflects an aspect of the present invention is as follows.

An electrostatic charge image developing toner comprising: toner base particles containing at least a binder resin and a magnetic material; and an external additive, wherein the binder resin contains a crystalline resin; and the external additive contains strontium titanate particles doped with metal elements other than titanium and strontium.

By the above means of the present invention, it is possible to provide an electrostatic charge image developing toner having improved low-temperature fixability, fog suppression and durability.

The mechanism of expression or mechanism of action of the effect of the present invention has not been clarified, but it is inferred as follows.

Most of the magnetic materials contained in the magnetic toner have relatively low electrical resistance, so when the magnetic material is exposed on the surface of the toner, charge attenuation is likely to occur, and the charge amount of the magnetic toner decreases in the development process. Therefore, by adhering the external additive to the surface of the toner base particles containing the magnetic material, the magnetic material is less likely to be exposed on the surface of the toner, and it is possible to suppress a decrease in the charge amount of the magnetic toner.

Since the external additive used needs to cover the surface of the toner base particles, it preferably has sufficient adhesive force to the toner base particles, and preferably has a small diameter and a high circularity. Further, in order to suppress a decrease in the amount of the charge of the magnetic toner, it is preferable that the resistance is high.

On the other hand, by including the crystalline resin in the binder resin in the toner base particles, the low-temperature fixability may be improved. However, in a high temperature and high humidity environment, the crystalline resin bleeds out to the surface of the toner base particles and the vicinity of the surface softens, so that the magnetic material is newly exposed on the surface of the toner base particles, or an external additive is buried in the toner base particles. As a result, it is difficult to suppress a decrease in the amount of the charge of the magnetic toner. Therefore, it is preferable that the external additive is difficult to be buried.

From such a viewpoint, the problem of the present invention is solved by containing strontium titanate particles doped with metal elements other than titanium and strontium in the external additive. Hereinafter, strontium titanate particles will be described in detail.

Strontium titanate is a composite oxide of strontium and titanium and has a perovskite structure. Each ion is arranged regularly and has a perovskite structure. However, in reality, since the ionic radius of the $Sr^{2+}$ ion in the center is large, the $O^{2-}$ ion is expanded, and a gap is created around the $Ti^{4+}$ ion in the center of the octahedron formed by the $O^{2-}$ ion. The $Ti^{4+}$ ion will be off center. Therefore, the positions of the electrical centers of the + ions and − ions do not match, and ionic polarization occurs.

Crystals of strontium titanate are formed by stacking crystal structures, but the directions of polarization are not all the same direction, but are different individually. However, since these polarizations are aligned in the same direction by applying an external electric field, they are largely polarized in the entire crystal of strontium titanate.

On the other hand, strontium titanate particles are easy to take the shape of a cube or a rectangular parallelepiped due to their high crystallinity, and it is difficult to externally attach them to the toner base particles. Therefore, by doping with a metal element other than titanium and strontium, the crystallinity may be lowered, the particles may be made into particles having a small diameter and a high circularity, and may be easily externally attached. Further, due to the decrease in crystallinity, the doped strontium titanate particle is further polarized.

The highly polarized, doped strontium titanate particles attracts, repels, and interacts with the magnetic material in the toner base particles by externally adding them to the toner base particles. That is, when the magnetic material tries to be exposed on the surface of the toner base particles, it repels the external strontium titanate particles and is pushed back into the toner base particles. Further, when the magnetic material is exposed on the surface of the toner base particles, the attracted strontium titanate particles covers the surface of the magnetic material, so that the exposure of the magnetic material as the toner particles is suppressed. That is, strontium titanate particle has a higher density than the resin used for the binder resin due to its high crystallinity, so that it is easily buried in the toner base particles, but due to the interaction with the magnetic material, burial is suppressed.

Further, in reality, the surface of the toner base particles is uneven, and the attached strontium titanate particles easily roll on the surface of the toner base particles and easily collect in the recesses. This recess is a place where the magnetic material and the surface of the toner base particle are relatively close to each other, but since the surface of the toner base particle is covered by the gathering of the strontium titanate particles, the exposure of the magnetic material as the toner particles is suppressed.

Further, since the magnetic material functions as a colorant and improves the transportability of the toner, it occupies a large proportion in the toner base particles as compared with a general pigment. Therefore, the space in which the external additive may be embedded is relatively small, and the implantation of the toner base particles of the external additive into the inside is suppressed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Figure 1:
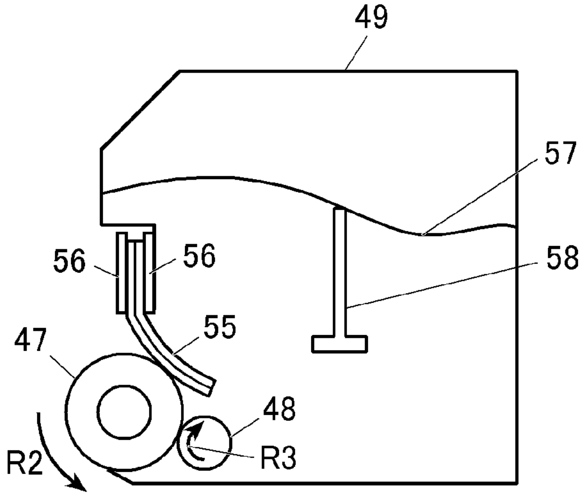
FIG. 1 is a schematic cross-sectional view showing an example of a developing device.

Hereinafter, one or more embodiments of the present invention will be described. However, the scope of the invention is not limited to the disclosed embodiments.

The electrostatic charge image developing toner of the present invention is an electrostatic charge image developing toner comprising: toner base particles containing at least a binder resin and a magnetic material; and an external additive, wherein the binder contains a crystalline resin; and the external additive contains strontium titanate particles doped with metal elements other than titanium and strontium. This feature is a technical feature common to or corresponding to the following embodiments.

As an embodiment of the present invention, the strontium titanate particles are preferably doped with lanthanum from the viewpoint of easy doping and easy control of the shape of strontium titanate particles.

From the viewpoint of durability, an average number of primary particle diameter of the strontium titanate particles is preferably in the range of 20 to 300 nm, and more preferably in the range of 20 to 100 nm. And further, an average circularity of primary particles of the strontium titanate particles is preferably in the range of 0.82 to 0.94.

From the viewpoint of low-temperature fixability, the crystalline resin is preferably made of crystalline polyester.

The image forming method of the present invention is an image forming method using an electrostatic charge image developing toner, and it is characterized to form an image using an electrostatic charge image developing toner of the present invention. This makes it possible to form an image by taking advantage of the characteristics of the electrostatic charge image developing toner of the present invention.

Hereinafter, the present invention, its constituent elements, and modes and embodiments for carrying out the present invention will be described in detail. In addition, in this application, "to" is used in the sense that the numerical values described before and after it are included as the lower limit value and the upper limit value.

<<1 Outline of the Electrostatic Charge Image Developing Toner of the Present Invention>>

The electrostatic charge image developing toner of the present invention (hereinafter, also simply referred to as a "toner") is an electrostatic charge image developing toner comprising: toner base particles containing at least a binder resin and a magnetic material; and an external additive. The toner is characterized in that the binder resin contains a crystalline resin and the external additive contains strontium titanate particles doped with metal elements other than titanium and strontium.

The toner of the present invention includes toner particles including toner base particles and an external additive attached to the surface of the toner base particles. In the present specification, the "toner base particle" constitutes the base of the "toner particle". The "toner base particle" according to the present invention contains at least a binder resin and a magnetic material, and other components such as a colorant, a mold release agent (wax), and a charge control agent, if necessary, may be contained. "Toner base particles" are referred to as "toner particles" due to the addition of an external additive. The "toner" refers to an aggregate of toner particles.

[1.1 Toner Base Particles]

<1.1.1 Magnetic Material>

The electrostatic charge image developing toner of the present invention is characterized by containing a magnetic material in the toner base particles, and functions as a magnetic toner by containing the magnetic material in the toner base particles. The magnetic toner may be suitably used as a one-component developer as it is without being mixed with the carrier.

The magnetic material contained in the toner base particles according to the present invention attracts, repels, and interacts with the doped strontium titanate particles, which is an external additive. Further, since the magnetic material occupies a large proportion in the toner base particles as compared with a general pigment, the space in which the external additive can be embedded is relatively small. Therefore, the electrostatic charge image developing toner of the present invention contains a magnetic material to prevent the external additive from being embedded in the toner base particles.

A "magnetic material" refers to a material that is magnetized by the application of a magnetic field. Further, "magnetization" is a phenomenon in which when an external magnetic field is applied to a magnetic material, the magnetic material is polarized to become a magnet. In the present invention, the magnetic material is preferably a ferromagnetic material. A "ferromagnetic material" is a material having a large coercive force, that is, when magnetized by an external magnetic field, the magnetized state is maintained even when the external magnetic field is removed.

The magnetic material is not particularly limited, and examples thereof include iron oxides such as magnetite, magnetite, and ferrite, elemental metals such as iron, cobalt and nickel, or alloys of these metals with metals such as aluminum, copper, magnesium, tin, zinc, beryllium, calcium, manganese, selenium, titanium, tungsten and vanadium, and a mixture thereof.

The number average primary particle diameter of the magnetic material is preferably 0.50 μm or less, and preferably in the range of 0.05 to 0.30 μm. The number average primary particle diameter may be measured using a transmission electron microscope. In the present invention, the term "primary particles" is used as a general term for crystals and those constituting strong aggregates in which the crystals share a specific surface (referred to as "aggregate"). A particle agglomerate (referred to as "agglomerate") formed by aggregating the primary particles is referred to as a "secondary particle".

Specifically, the toner particles to be observed are sufficiently dispersed in the epoxy resin and then cured in an atmosphere at a temperature of 40° C. for 2 days to obtain a cured product. Using the obtained cured product as a flaky sample by a microtome, an image with a magnification of 10,000 to 40,000 times is taken with a transmission electron microscope (TEM), and the primary particles of 100 magnetic materials in the image are taken and the projected area are measured. Then, the equivalent diameter of the circle equal to the projected area is defined as the particle diameter of the primary particles of the magnetic material, and the average value of the 100 particles is defined as the number average primary particle diameter of the magnetic material.

As the magnetic characteristics of the magnetic material when 795.8 kA/m is applied, the coercive force (Hc) is preferably 1.6 to 12.0 kA/m. The magnetization strength ($\sigma s$) is preferably 50 to 200 $Am^2/kg$, more preferably it is 50 to 100 $Am^2/kg$. On the other hand, the residual magnetization ($\sigma r$) is preferably 2 to 20 $Am^2/kg$.

The content of the magnetic material in the toner base particles is preferably in the range of 35 to 50 mass %, more preferably it is in the range of 40 to 50 mass %, based on the total mass of the toner base particles. When the content of the magnetic material is within the above range, the magnetic attraction with the magnet roll in the developing sleeve becomes appropriate.

The content of the magnetic material in the toner base particles may be measured using a thermal analyzer TGA Q5000IR manufactured by PerkinElmer Co., Ltd. The measuring method is to heat the magnetic toner from room temperature to 900° C. at a heating rate of 25° C./min in a nitrogen atmosphere, and set the weight loss mass at 100 to 750° C. as the mass of the component excluding the magnetic material from the magnetic toner, and the residual mass is made to be a mass of the magnetic material.

The magnetic material may be produced, for example, by the following method. Add an equivalent amount or more of an alkali such as sodium hydroxide to the iron component to the ferrous salt aqueous solution to prepare an aqueous solution containing ferrous hydroxide. Air is blown while maintaining the pH of the prepared aqueous solution at 7 or more, and the oxidation reaction of ferrous hydroxide is carried out while heating the aqueous solution to 70° C. or higher to generate seed crystals which are the cores of magnetic iron oxide.

Next, an aqueous solution containing about 1 equivalent of ferrous sulfate is added to the slurry liquid containing the seed crystals based on the amount of the alkali added in advance. The pH of the mixed solution is maintained at 5 to 10, and the reaction of ferrous hydroxide is promoted while blowing air to grow magnetic iron oxide around the seed crystal. At this time, the shape and magnetic characteristics of the magnetic material may be controlled by selecting an arbitrary pH, reaction temperature, and stirring conditions. As the oxidation reaction progresses, the pH of the mixed solution shifts to the acidic side, but the pH of the mixed solution is preferably 5 or more. A magnetic material may be obtained by filtering, washing and drying the obtained mixed solution by a conventional method. Further, the magnetic material may be subjected to a known surface treatment if necessary.

<1.1.2 Binder Resin>

The electrostatic charge image developing toner of the present invention is characterized in that the binder resin in the toner base particles contains a crystalline resin. By including the crystalline resin in the binder resin in the toner base particles, the low-temperature fixability may be improved.

A "binding resin (also referred to as "binder resin") is used as a medium or matrix (base) for dispersing internal additives (wax, charge control agent, pigment) and external additives (silica, titanium oxide) contained in toner particles. Moreover, it refers to a resin having a function of adhering to a recording medium (for example, paper) during the fixing process of a toner image.

The binder resin according to the present invention is not particularly limited, and conventionally known ones may be used. Examples thereof include: polyester resin; polymers of styrene such as polyvinyltoluene and its substitutions; styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-α-chloromethyl methacrylate copolymer, styrene-acrylonitrile copolymer, styrene-vinyl methyl ketone copolymer, styrene-butadiene copolymer, styrene-isoprene copolymer, styrene-acrylonitrile-inden copolymer, styrene-maleic acid copolymer, styrene-maleic acid ester copolymer; poly(methyl methacrylate), poly(butyl methacrylate), poly(vinylchloride), poly(vinyl acetate), polyethylene, polypropylene, epoxy resin, epoxy polyol resin, polyurethane, polyamide, polyvinyl butyral, polyacrylic acid resin, rosin, modified rosin, terpene resin, aliphatic or alicyclic hydrocarbon resin, and aromatic petroleum resin. These resins may be used alone or in combination of two or more.

Further, "the binder resin contains a crystalline resin" may mean the form in which the binder resin contains the crystalline resin itself. Otherwise, like a crystalline polyester polymer segment in a hybrid crystalline polyester resin and a crystalline polyester polymer segment in a hybrid amorphous polyester resin, it may be the form of including a segment contained in another resin. In the present invention, the binder resin preferably contains an amorphous resin in addition to the crystalline resin, from the viewpoint of low-temperature fixability and heat-resistant storage property of the toner.

<1.1.2.1 Crystalline Resin>

In the present invention, the crystalline resin refers to a resin having a clear endothermic peak instead of a stepped endothermic change in the differential calorimetry curve measured by a differential scanning calorimeter (DSC). Specifically, the endothermic peak means a peak in which the half value width of the endothermic peak is within 15° C. when measured at a heating rate of 10° C./min in the DSC measurement. The DSC measurement uses a differential scanning calorimeter (Diamond DSC manufactured by PerkinElmer Co. Ltd.), the melting point of indium and zinc is used to correct the temperature of the detector of this device, and the heat of fusion of indium is used to correct the calorific value.

Due to its high crystallinity, such a crystalline resin has a high viscosity until just before the melting point temperature, and the viscosity drops sharply near the melting point temperature. Therefore, since the binder resin contains a crystalline resin, a toner having high storage stability in a high temperature environment (heat-resistant storage property) and high fixing property may be obtained.

The melting point (Tm) of the crystalline resin is preferably in the range of 55 to 90° C., more preferably in the range of 70 to 85° C. from the viewpoint of low-temperature fixability and hot-offset resistance. The melting point of the crystalline resin may be controlled by the resin composition.

The melting point (Tm) is a temperature at the top of the endothermic peak and may be measured by DSC. Specifically, the sample is sealed in an aluminum pan KINTO B0143013. It is set in a sample holder of a thermal analyzer Diamond DSC (manufactured by PerkinElmer Co., Ltd.), and the temperature is changed in the order of heating, cooling, and heating. During the first heating, the temperature is raised from room temperature (25° C.) to 150° C., and during the second heating, from 0° C. to 150° C. at a heating rate of 10° C./min, and the temperature is maintained at 150° C. for 5 minutes. The temperature is lowered from 150° C. to 0° C. at a temperature lowering rate of 10° C./min, and the temperature of 0° C. is maintained for 5 minutes. The temperature at the top of the endothermic peak in the endothermic curve obtained during the second heating is measured as the melting point.

The content of the crystalline resin in the toner base particles is preferably in the range of 1 to 40 mass % with respect to the total mass of the toner base particles from the viewpoint of low-temperature fixability and heat storage property. It is more preferably in the range of 5 to 30 mass %. When the content of the crystalline resin is 1 mass % or more, sufficient low-temperature fixing property is obtained, and when it is 40 mass % or less, the thermal stability, the stability against physical stress, and sufficient heat-resistance storage as a toner are obtained.

Further, the content of the crystalline resin is preferably in the range of 2 to 20 mass % with respect to the total mass of the binder resin from the viewpoint of low-temperature fixability and heat resistance. It is more preferably in the range of 5 to 20 mass %, and even more preferably in the range of 7 to 15 mass %. When the content of the crystalline resin is 2 mass % or more, a sufficient plastic effect is obtained and the low-temperature fixability is more remarkable, and when it is 20 mass % or less, the heat resistance is improved, and sufficient thermal stability, stability against physical stress, and heat-resistant storage as a toner are obtained.

From the viewpoint of low-temperature fixability and gloss stability, the number average molecular weight (Mn) of the crystalline resin is preferably in the range of 3,000 to 12,500, and more preferably in the range of 4,000 to 11,000. Further, the weight average molecular weight (Mw) of the crystalline resin is preferably in the range of 10,000 to 100,000, more preferably in the range of 15,000 to 80,000, and still more preferably in the range of 20,000 to 50,000.

When Mw and Mn are within the above ranges, sharp melt properties are likely to be exhibited and the fixing temperature is easily controlled. In addition, sufficient strength may be obtained in the fixed image. Further, in the production of the toner, the crystalline resin is not crushed during the stirring of the emulsion, and the glass transition temperature Tg of the toner is kept constant, so that the thermal stability of the toner is maintained. Mw and Mn may be obtained from the molecular weight distribution measured by gel permeation chromatography (GPC) as follows.

(Measuring Method of Molecular Weight of Crystalline Resin)

The sample is added in tetrahydrofuran (THF) to a concentration of 0.1 mg/mL, heated to 40° C. to completely dissolve it, and then treated with a membrane filter having a pore size of 0.2 μm to prepare the sample solution (sample). Then, the measurement is performed under the following conditions. Specifically, a GPC apparatus HLC-8220GPC (manufactured by Tosoh Corporation) and a column "TSKgelSuperH3000" (manufactured by Tosoh Corporation) are used, and THF is used as a carrier solvent (eluent) and it is flowed at a flow rate of 0.6 mL/min while maintaining the column temperature at 40° C. 100 μL of the prepared sample solution is injected into the GPC device together with the carrier solvent, and the sample is detected using a differential refractive index detector (RI detector). Then, the molecular weight distribution of the sample is calculated using the calibration curve measured using 10 points of monodisperse polystyrene standard particles. In the data analysis, when a peak caused by the above filter is confirmed, a baseline is set before the peak and the analyzed data is used as the molecular weight of the sample.

Measurement model: GPC device HLC-8220GPC (manufactured by Tosoh Corporation)
Column: "TSKgelSuperH3000" (manufactured by Tosoh Corporation)
Eluent: THF
Temperature: Column constant temperature bath 40.0° C.
Flow rate: 0.6 ml/min
Concentration: 0.1 mg/mL (0.1 wt/vol %)
Calibration curve: Standard polystyrene sample (manufactured by Tosoh Corporation)
Injection amount: 100 μL
Solubility: Complete dissolution (heating at 40° C.)
Pretreatment: Filtration with a 0.2 μm filter
Detector: Differential refractometer (RI)

As the crystalline resin, one type may be used alone, or two or more types may be used in combination. The type of crystalline resin is not particularly limited, and examples thereof include a crystalline polyolefin resin, a crystalline polydiene resin, a crystalline polyester resin, a crystalline polyamide resin, a crystalline polyurethane resin, a crystalline polyacetal resin, a crystalline polyethylene terephthalate resin, a crystalline polybutylene terephthalate resin, a crystalline polyphenylene sulfide resin, a crystalline polyether ether ketone resin, and a crystalline polytetrafluoroethylene resin. Among these, a crystalline polyester resin is preferable from the viewpoint of low-temperature fixability and gloss stability. Since the crystalline polyester resin melts at the time of heat fixing and acts as a plasticizing agent for the amorphous resin, the low-temperature fixing property may be improved.

Further, from the viewpoint of low-temperature fixability and heat-resistant storage, it is preferable to use a crystalline polyester resin and an amorphous resin in combination as the binder resin, and it is more preferable to use a crystalline polyester resin and a vinyl resin in combination.

[Crystalline Polyester]

Crystalline polyester (hereinafter, also referred to as a "crystalline polyester resin") is obtained by a polycondensation reaction between a divalent or higher carboxylic acid (polyvalent carboxylic acid) and a divalent or higher alcohol (polyhydric alcohol). Among the known polyester resins, the crystalline polyester resin is a resin having a clear heat absorption peak rather than a stepped heat absorption change in the differential scanning calorific value measurement (DSC) described above.

Further, since the crystalline polyester resin melts at the time of heat fixing and acts as a thermoplastic agent for the amorphous resin, the low-temperature fixability of the toner may be improved. Further, the crystalline polyester resin may be used alone or in combination of two or more.

The crystalline polyester resin is not particularly limited as long as it is as defined above. For example, a resin having a structure in which another component is copolymerized with a main chain made of a crystalline polyester resin also falls under the crystalline polyester resin referred to in the present invention as long as the resin exhibits the above-mentioned clear heat absorption peak.

From the viewpoint of low-temperature fixability and gloss stability, the number average molecular weight (Mn) of the crystalline polyester resin is preferably in the range of 3,000 to 12,500, and more preferably in the range of 4,000 to 11,000. The weight average molecular weight (Mw) of the crystalline polyester resin is preferably in the range of 10,000 to 100,000, more preferably in the range of 12,000 to 80,000, and still more preferably in the range of 14,000 to 50,000. When it is within the above range, the melting point of the obtained toner is within a suitable range, the blocking resistance is excellent, and the low-temperature fixability is also excellent. The number average molecular weight (Mn) and the weight average molecular weight (Mw) may be measured by the above-mentioned gel permeation chromatography (GPC).

The acid value (AV) of the crystalline polyester resin is preferably 5 to 70 mg KOH/g. The acid value may be measured according to the method described in JIS K2501: 2003.

When the crystalline resin contained in the binder resin is a crystalline polyester resin, the content of the crystalline polyester resin may be in the range of 2 to 20 mass % with respect to the total mass of the binder resin. It is preferably in the range of 5 to 20 mass %, more preferably in the range of 7 to 15 mass %. When the content of the crystalline polyester resin is 2 mass % or more, the low-temperature fixability is excellent, and when the content is 20 mass % or less, the heat resistance is excellent.

The crystalline polyester resin is produced from a polyvalent carboxylic acid component and a polyhydric alcohol component. The valences of the polyvalent carboxylic acid component and the polyhydric alcohol component are preferably 2 to 3 respectively, and particularly preferably each valence is 2.

(Polyvalent Carboxylic Acid)

A polyvalent carboxylic acid is a compound containing two or more carboxy groups in one molecule. Examples of the polyvalent carboxylic acid include a dicarboxylic acid. As the dicarboxylic acid, one type may be used alone, or two or more types may be used in combination. Further, the dicarboxylic acid is preferably an aliphatic dicarboxylic acid, and may further contain an aromatic dicarboxylic acid. The aliphatic dicarboxylic acid is preferably linear, from the viewpoint of enhancing the crystallinity of the crystalline polyester resin.

Examples of the above aliphatic dicarboxylic acids include saturated aliphatic dicarboxylic acids such as oxalic acid, malonic acid, succinic acid, glutaric acid, adipic acid (hexanedioic acid), pimelic acid, suberic acid (octanedioic acid), azelaic acid, and sebacic acid (decanedioic acid), N-dodecylsuccinic acid, 1,9-nonandicarboxylic acid, 1,10-decandicarboxylic acid (dodecanedioic acid), 1,11-undecanedicarboxylic acid, 1,12-dodecanedicarboxylic acid (tetradecanedioic acid), 1,13-tridecanedicarboxylic acid, 1,14-tetradecanedicarboxylic acid, 1,16-hexadecanedicarboxylic acid, 1,18-octadecanedicarboxylic acid, their lower alkyl esters, and their anhydrides. Above all, from the viewpoint of achieving both low-temperature fixability and transferability, an aliphatic dicarboxylic acid having 6 to 16 carbon atoms is preferable, and an aliphatic dicarboxylic acid having 10 to 14 carbon atoms is more preferable.

Examples of the aromatic dicarboxylic acid include phthalic acid, terephthalic acid, isophthalic acid, orthophthalic acid, t-butylisophthalic acid, 2,6-naphthalenedicarboxylic acid and 4,4'-biphenyldicarboxylic acid. Of these, terephthalic acid, isophthalic acid or t-butylisophthalic acid is preferable from the viewpoint of availability and ease of emulsification.

In addition to the above, the polyvalent carboxylic acid includes an alicyclic dicarboxylic acid such as cyclohexanedicarboxylic acid, a trivalent or higher polyvalent carboxylic acid such as trimellitic acid and pyromellitic acid; and an anhydride of these carboxylic acid compounds. Alternatively, an alkyl ester having 1 to 3 carbon atoms may be also mentioned.

The polyvalent carboxylic acid may be used alone or in combination of two or more.

The content of the constituent unit derived from the aliphatic dicarboxylic acid with respect to the constituent unit derived from the dicarboxylic acid is preferably 50 mol % or more, more preferably 70 mol % or more, still more preferably 80 mol % or more, and particularly preferably, it is 100 mol %, from the viewpoint of the crystallinity of the crystalline polyester resin.

(Polyhydric Alcohol)

A polyhydric alcohol is a compound containing two or more hydroxy groups in one molecule. Examples of the polyhydric alcohol component include diol. As the diol, one type may be used alone, or two or more types may be used in combination. Further, the diol is preferably an aliphatic diol, and may further contain other diols. The aliphatic diol is preferably a linear type from the viewpoint of enhancing the crystallinity of the crystalline polyester resin.

Examples of the aliphatic diol include ethylene glycol, propylene glycol (1,2-propanediol), 1,3-propanediol, neopentyl glycol (2,2-dimethyl-1,3-propanediol), 1,4-Butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol and 1,20-eicosanediol. Above all, from the viewpoint of achieving both low-temperature fixability and transferability, an aliphatic diol having 2 to 20 carbon atoms is preferable, and an aliphatic diol having 4 to 12 carbon atoms is more preferable.

Examples of other diols include diols having a double bond and diols having a sulfonic acid group. Specifically, examples of diols having a double bond include 1,4-butenediol, 2-butene-1,4-diol, 3-butene-1,6-diol and 4-butene-1,8-diol.

Examples of the trihydric or higher polyhydric alcohol include glycerin, pentaerythritol, trimethylolpropane, and sorbitol.

The polyhydric alcohol may be used alone or in combination of two or more.

The content of the constituent unit derived from the aliphatic diol with respect to the constituent unit derived from the diol is preferably 50 mol % or more, more preferably 70 mol % or more, still more preferably 80 mol % or more, and particularly preferably, it is 100 mol %, from the viewpoint of low-temperature fixability and gloss stability.

The ratio of the diol to the dicarboxylic acid in the monomers constituting the crystalline polyester resin, that is, the equivalent ratio of the hydroxy group [—OH] of the diol to the carboxy group [—COOH] of the dicarboxylic acid [—OH]/[—COOH] is preferably in the range of 2.0/1.0 to 1.0/2.0, more preferably in the range of 1.5/1.0 to 1.0/1.5, and still more preferably in the range of 1.3/1.0 to 1.0/1.3.

The monomers constituting the crystalline polyester resin preferably contain 50 mass % or more of a linear aliphatic monomer, and more preferably 80 mass % or more. When a linear aliphatic monomer is used, the crystallinity of the crystalline polyester resin is high, and the melting point (the temperature of the peak top of the endothermic peak) is often high. Further, when a branched aliphatic monomer is used, the crystallinity is low and the melting point is often low. Therefore, it is preferable to use a linear aliphatic monomer as the monomer.

The crystalline polyester resin may be synthesized by polycondensing (esterifying) the polyvalent carboxylic acid and the polyhydric alcohol using a known esterification catalyst.

The esterification catalyst may be used alone or in combination of two or more. Examples are alkali metal compounds such as sodium and lithium; compounds containing Group 2 elements such as magnesium and calcium; metal compounds such as aluminum, zinc, manganese, antimony, titanium, tin, zirconium and germanium; phosphite compounds; phosphoric acid compound; and amine compound.

Specifically, examples of the tin compound include dibutyltin oxide, tin octylate, tin dioctylate, and salts thereof. Examples of the titanium compound include titanium alkoxides such as tetranormal butyl titanate, tetraisopropyl titanate, tetramethyl titanate, tetrastearyl titanate; titanium acylates such as polyhydroxytitanium stearate; and titanium chelate such as titanium tetraacetylacetonate, titanium lactate; titanium triethanol aminate. Examples of the germanium compound include germanium dioxide, and examples of aluminum compounds include oxides such as polyaluminum hydroxide, aluminum alkoxides, and tributylaluminates.

The polymerization temperature of the crystalline polyester resin is preferably in the range of 150 to 250° C. The polymerization time is preferably in the range of 0.5 to 10 hours. During the polymerization, the pressure inside the reaction system may be reduced, if necessary.

The crystallinity and the amount of heat of fusion of the crystalline polyester resin may be controlled by selecting the structure of the crystalline polyester resin and the constituent monomers. From the viewpoint of adjusting the crystallinity of the crystalline polyester resin to a range preferable for fixing, the crystalline polyester resin is preferably a hybrid crystalline polyester resin described below. The hybrid crystalline polyester resin may be used alone or in combination of two or more. Further, the hybrid crystalline polyester resin may be replaced with the total amount of the crystalline polyester resin, or may be replaced with a part thereof.

[Hybrid Crystalline Polyester Resin]

The crystalline resin according to the present invention is preferably a crystalline polyester resin, and from the viewpoint of low-temperature fixability, the crystalline polyester resin is a hybrid crystalline polyester resin containing a structure of a crystalline polyester resin and a structure of an amorphous resin. Since the hybrid crystalline polyester resin contains the structure of the amorphous resin, the compatibility with the amorphous resin is enhanced, the finely dispersed state may be maintained in the binder resin. Moreover, since the structure of the crystalline polyester resin is included, the sharp melt property of the crystalline resin is more exhibited at the time of fixing, and the low-temperature fixability is improved. When the toner base particles have a core-shell structure, it is preferable to include the hybrid crystalline polyester resin in the core portion from the viewpoint that the crystalline polyester resin is less likely to be exposed on the surface of the toner base particles.

The hybrid crystalline polyester resin is a resin having a structure in which a crystalline polyester polymer segment and an amorphous polymer segment are chemically bonded. The crystalline polyester polymer segment means a portion derived from the crystalline polyester resin. That is, it means a molecular chain having the same chemical structure as the molecular chain constituting the crystalline polyester resin described above. Further, the amorphous polymer segment means a portion derived from the amorphous resin. That is, it means a molecular chain having the same chemical structure as the molecular chain constituting the amorphous resin described later.

The weight average molecular weight (Mw) of the hybrid crystalline polyester resin is preferably in the range of 20,000 to 50,000. By setting Mw to 50,000 or less, sufficient low-temperature fixability may be obtained. On the other hand, when the Mw is 20,000 or more, it is possible to suppress excessive progress of the compatibility between the hybrid resin and the amorphous resin during toner storage, and it is possible to suppress image defects due to fusion of the toners. The above-mentioned method for measuring the molecular weight of a crystalline resin may be applied to the measurement of the weight average molecular weight.

For the same reason, the number average molecular weight (Mn) of the hybrid crystalline polyester resin is preferably in the range of 3,000 to 12,500, and more preferably in the range of 4,000 to 11,000.

When the crystalline resin contains a hybrid crystalline polyester resin, the content of the hybrid crystalline polyester resin is preferably in the range of 2 to 20 mass % with respect to the total mass of the binder resin, more preferably in the range of 5 to 20 mass %, and still more preferably in the range of 7 to 15 mass %. When the content of the hybrid crystalline polyester resin is 2 mass % or more, the low-temperature fixability is excellent, and when the content is 20 mass % or less, the heat resistance is excellent.

The structure of the chemical bond is not particularly limited, and it may be a block copolymer or a graft copolymer, but it is preferable that the crystalline polyester polymer segment is grafted to the amorphous polymer segment as a main chain. That is, the hybrid crystalline polyester resin is preferably a graft copolymer having an amorphous polymer segment as a main chain and a crystalline polyester polymer segment as a side chain.

Hereinafter, a hybrid crystalline polyester resin having such a structure will be described.

(Crystalline Polyester Polymer Segment)

The crystalline polyester polymer segment refers to a portion derived from the crystalline polyester resin. That is, it refers to a molecular chain having the same chemical structure as that constituting a crystalline polyester resin.

The crystalline polyester polymer segment has the same meaning as the above-mentioned crystalline polyester resin, and is a portion derived from a known polyester resin obtained by a polycondensation reaction between a polyvalent carboxylic acid and a polyhydric alcohol. The crystalline polyester polymer segment may be synthesized from the polyvalent carboxylic acid and the polyhydric alcohol in the same manner as the above-mentioned crystalline polyester resin. The polyvalent carboxylic acid component and the polyhydric alcohol component constituting the crystalline polyester polymer segment are the same as the contents of the "polyvalent carboxylic acid" and "polyhydric alcohol" items described in the above-mentioned crystalline polyester resin. Therefore, the description thereof will be omitted.

The content of the crystalline polyester polymer segment is preferably in the range of 80 to 98 mass %, more preferably in the range of 90 to 95 mass %, based on the total mass of the hybrid crystalline polyester resin. Within the above range, sufficient crystallinity may be imparted to the hybrid crystalline polyester resin. The components and their contents of each segment in the hybrid crystalline polyester resin (or toner particles) may be specified by using a known analysis methods, for example, such as nuclear magnetic resonance (NMR) measurement, and methylation reaction pyrolysis gas chromatography/mass spectrometry (Py-GC/MS).

The crystalline polyester polymer segment preferably contains a monomer having an unsaturated bond from the viewpoint of introducing a chemical bond site with the amorphous polymer segment into the segment. Monomers having unsaturated bonds are, for example, polyvalent carboxylic acids and polyhydric alcohols having double bonds. Examples thereof include polyvalent carboxylic acids such as methylene succinic acid, fumaric acid, maleic acid, 3-hexendioic acid, 3-octendioic acid; and polyhydric alcohols such as 2-butene-1,4-diol, 3-butene-1,6-diol and 4-butene-1,8-diol. The content of the structural unit derived from the monomer having an unsaturated bond in the crystalline polyester polymer segment is preferably in the range of 0.5 to 20 mass % with respect to the total mass of the crystalline polyester polymer segment.

In addition, a functional group such as a sulfonic acid group, a carboxy group, and a urethane group may be further introduced into the hybrid crystalline polyester resin. The introduction of the functional group may be carried out in the crystalline polyester polymer segment or in the amorphous polymer segment.

(Amorphous Polymer Segment)

The amorphous polymer segment refers to a portion derived from an amorphous resin. That is, it refers to a molecular chain having the same chemical structure as that constituting an amorphous resin. The amorphous polymer segment enhances the compatibility between the hybrid crystalline polyester resin and the amorphous resin when the binder resin according to the present invention contains the amorphous resin. Therefore, the hybrid crystalline resin is easily incorporated into the amorphous resin, and the charge uniformity of the toner is further improved. The constituents and their contents of the amorphous polymer segments in the hybrid crystalline polyester resin (or toner particles) may be specified by using a known analysis methods, for example, such as nuclear magnetic resonance (NMR) measurement, and methylation reaction pyrolysis gas chromatography/mass spectrometry (Py-GC/MS).

Further, the amorphous polymer segment is a polymer segment having a relatively high glass transition temperature (Tg) and having no melting point when differential scanning calorimetry (DSC) is performed on a resin having the same chemical structure and molecular weight. Similar to the amorphous resin, the amorphous polymer segment preferably has a glass transition temperature (Tg) in the range of 30 to 80° C. in the first temperature raising process of DSC.

It is more preferable to be in the range of 40 to 65° C. The glass transition temperature (Tg) may be measured by the same method as that of the amorphous resin Tg.

It is preferable that the amorphous polymer segment is composed of the same type of resin as the amorphous resin (for example, a vinyl resin) contained in the binder resin, from the viewpoint of enhancing the compatibility with the binder resin and makes the toner charge uniform. With such a form, the compatibility between the hybrid crystalline polyester resin and the amorphous resin is further improved. The "same type of resin" means resins having the characteristic chemical bonds in a repeating unit.

The meaning of "the characteristic chemical bonds" is determined by "polymer classification" indicated in a database provided by National Institute for Material Science (NIMS): (http://polymer.nims.go.jp/PoLvlnfo/guide/jp/term polymer.html). Namely, the chemical bonds which constitute the following 22 kinds of polymers are called as "the characteristic chemical bonds": polyacryls, polyamides, polyacid anhydrides, polycarbonates, polydienes, polyesters, poly-halo-olefins, polyimides, polyimines, polyketones, polyolefins, polyethers, polyphenylenes, polyphosphazenes, polysiloxanes, polystyrenes, polysulfides, polysulfones, polyurethanes, polyureas, polyvinyls and other polymers.

When the resin is a copolymer, "resins of the same kind" means resins that have characteristic chemical bonds in common when the constituent units are monomer species having the above chemical bonds in the chemical structure of the plurality of monomer species constituting the copolymer. Therefore, even if the properties shown by the resins themselves are different from each other or the molar component ratios of the monomer species constituting the copolymer are different from each other, they are considered to be the same type of resin if they have the characteristic chemical bond in common.

For example, the resin (or polymer segment) formed by styrene, butyl acrylate and acrylic acid and the resin (or polymer segment) formed by styrene, butyl acrylate and methacrylic acid have at least a chemical bond constituting a polyacrylic resin, therefore they are the same type of resin. As a further example, the resin (or polymer segment) formed by styrene, butyl acrylate, and acrylic acid and the resin (or polymer segment) formed by styrene, butyl acrylate, acrylic acid, terephthalic acid, and fumaric acid have a chemical bonds common to each other. That is, they have at least one chemical bond that constitutes a polyacrylic resin. Therefore, they are the same type of resin.

From the viewpoint of introducing a chemical bonding site with the crystalline polyester polymer segment into the amorphous polymer segment, it is preferable that the amorphous polymer segment contains the amphoteric compound described below in the monomer. The content of the constituent unit derived from the amphoteric compound is preferably in the range of 0.5 to 20 mass % of the total mass of the amorphous polymer segment.

From the viewpoint of imparting sufficient crystallinity to the hybrid crystalline polyester resin, it is preferable that the content of the amorphous polymer segment is in the range of 2 to 20 mass % relative to the total mass of the hybrid crystalline polyester resin. The content of the amorphous polymer segment is more preferably in the range of 3 to 15 mass %, and still more preferably in the range of 5 to 10 mass %. It is particularly preferable to be in the range of 7 to 9 mass %.

The resin components comprising the amorphous polymer segment are not particularly limited, but include, for example, vinyl polymer segments, urethane polymer segments, and urea polymer segments. Of these, vinyl polymer segments are preferred from the viewpoint of thermoplasticity.

When the vinyl polymer segment is used, it is preferable to use vinyl resin as the amorphous resin in the binder resin, and furthermore, it is preferable that the vinyl resin is contained in the largest proportion in the binder resin. This increases the compatibility between the vinyl polymer segment and the vinyl resin, and allows the hybrid crystalline polyester resin to maintain a more finely dispersed state in the binder resin, so that the sharp melt property of the crystalline resin may be more easily demonstrated during fixing. The vinyl polymer segment may be synthesized in the same way as the vinyl resin.

The vinyl polymer segment is not limited to any polymer of vinyl compounds, but for example, an acrylic ester polymer segment, a styrene-acrylic ester polymer segment, and an ethylene-vinyl acetate polymer segment may be cited. One type of these may be used alone, and two or more types may be used in combination.

Among the above vinyl polymer segments, the styrene-acrylic ester polymer segment (also referred to simply as the "styrene-acrylic polymer segment") is preferred in consideration of plasticity during heat fixing. Therefore, the styrene-acrylic polymer segment as an amorphous polymer segment will be described below.

(Styrene-Acrylic Polymer Segment)

The styrene-acrylic polymer segment is formed by the addition polymerization of at least a styrene monomer and a (meth)acrylic ester monomer. The styrene monomer referred to here includes styrene represented by the structural formula $CH_2{=}CH{-}C_6H_5$, as well as styrene structures having known side chains or functional groups in the styrene structure. The (meth)acrylic acid ester monomer here includes acrylic acid ester compounds represented by $CH_2{=}CHCOOR$ (R is an alkyl group) and methacrylic acid ester compounds, as well as ester compounds with known side chains or functional groups in the structure, such as acrylic acid ester derivatives and methacrylic acid ester derivatives.

The following are specific examples of styrene monomers and (meth)acrylic ester monomers that may be used to form styrene-acrylic polymer segments used in the present invention. However, the ones that may be used for forming the styrene-acrylic polymer segment used in the present invention are not limited to the following.

(Styrene Monomer)

Specific examples of the styrene monomer include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene. These styrene monomers may be used alone or in combination of two or more.

((Meth)Acrylic Ester Monomer)

Specific examples of the (meth)acrylic ester monomer include acrylic ester monomers such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, and phenyl acrylate; and methacrylic ester monomers such as methyl methacrylate, ethyl methacrylate, n-butyl methacrylate, isopropyl methacrylate, isobutyl methacrylate, ethyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate. Of these, it is preferable to use long-chain acrylic acid ester monomers. Specifically, methyl acrylate, n-butyl acrylate, and 2-ethylhexyl acrylate are preferred.

In this specification, "(meth)acrylic ester monomer" is a generic term for "acrylic ester monomer" and "methacrylic ester monomer". For example, "(meth)acrylic acid methyl ester" is a generic term for "methyl acrylate" and "methyl methacrylate".

These acrylic ester monomers or methacrylic ester monomers may be used alone as one type or in combination with two or more types. That is, a copolymer may be formed using a styrene monomer and two or more acrylic ester monomers, a copolymer may be formed using a styrene monomer and two or more methacrylic ester monomers, or a copolymer may be formed using a styrene monomer, and an acrylic ester monomer and a methacrylic ester monomer in combination.

From the viewpoint of plasticity, the content of the constituent units derived from styrene monomer in the styrene-acrylic polymer segment is preferably in the range of 40 to 90 mass % of the total mass of the styrene-acrylic polymer segment. From the same viewpoint, the content of the constituent unit derived from the (meth)acrylic ester monomer in the styrene-acrylic polymer segment is preferably in the range of 10 to 60 mass % of the total mass of the styrene-acrylic polymer segment.

Further, the styrene-acrylic polymer segment may be addition-polymerized with a compound for chemically bonding to the crystalline polyester polymer segment in addition to the styrene monomer and the (meth) acrylic acid ester monomer. Specifically, it is preferable to use a compound that forms an ester bond with the hydroxy group [—OH] derived from the polyhydric alcohol component or the carboxy group [—COOH] derived from the polyvalent carboxylic acid component contained in the crystalline polyester polymer segment. Therefore, it is preferable that the styrene-acrylic polymer segment is capable of addition polymerization to the above styrene monomer and (meth) acrylic ester monomer, and it is preferable that the styrene-acrylic polymer segment has a structure in which compounds having a carboxy group [—COOH] or hydroxy group [—COOH] are further polymerized.

Examples of such a compound include compounds having a carboxy group such as acrylic acid, methacrylic acid, maleic acid, itaconic acid, fumaric acid, maleic acid monoalkyl ester, and itaconic acid monoalkyl ester; and compounds having a hydroxy group such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and polyethylene glycol mono (meth)acrylate.

The content of the structural unit derived from the above compound in the styrene-acrylic polymer segment is preferably in the range of 0.5 to 20 mass % with respect to the total mass of the styrene-acrylic polymer segment, from the viewpoint of introducing the chemical bond site with the crystalline polyester polymer segment into the styrene-acrylic polymer segment.

The method of forming a styrene-acrylic polymer segment is not limited to any particular method, but includes polymerization of monomers using known oil-soluble or water-soluble polymerization initiators. The oil-soluble polymerization initiators include the azo or diazo polymerization initiators and peroxide polymerization initiators shown below.

(Azo or Diazo Polymerization Initiator)

Examples of the azo or diazo polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

(Peroxide Polymerization Initiator)

Examples of the peroxide polymerization initiator include benzoyl peroxide, methyl ethyl ketone peroxide, diisopropyl peroxycarbonate, cumene hydroperoxide, t-butyl hydroperoxide, di-t-butyl peroxide, t-butyl peroxypivalate, dicumyl peroxide, 2,4-dichlorobenzoyl peroxide, lauroyl peroxide, 2,2-bis-(4,4-t-butylperoxycyclohexyl)propane, and tris-(t-butylperoxy)triazine.

When resin particles are formed by emulsion polymerization method, water-soluble radical polymerization initiators may be used. Water-soluble radical polymerization initiators include persulfates such as potassium persulfate and ammonium persulfate, azobisaminodipropane acetate, azobiscyanovaleric acid and its salts, and hydrogen peroxide.

(Manufacturing Method of Hybrid Crystalline Polyester Resin)

The manufacturing method of the hybrid crystalline polyester resin is not particularly limited as long as it is a method capable of forming a polymer having a structure in which the crystalline polyester polymer segment and the amorphous polymer segment are chemically bonded. As a specific manufacturing method of the hybrid crystalline polyester resin, for example, it may be manufactured by the first to third manufacturing methods shown below.

[First Manufacturing Method]

The first manufacturing method is to synthesize a hybrid crystalline polyester resin by conducting a polymerization reaction to manufacture a crystalline polyester polymer segment in the presence of a pre-synthesized amorphous polymer segment.

[Second Manufacturing Method]

The second manufacturing method is to form a crystalline polyester polymer segment and an amorphous polymer segment, respectively, and then combine them to manufacture a hybrid crystalline polyester resin.

[Third Manufacturing Method]

The third manufacturing method is to manufacture a hybrid crystalline polyester resin through a polymerization reaction that manufactures an amorphous polymer segment in the presence of a crystalline polyester polymer segment.

Among the above manufacturing methods from the first to the third, the first manufacturing method is preferred because it is easier to manufacture hybrid crystalline polyester resin with a structure in which crystalline polyester polymer chains (crystalline polyester resin chains) are grafted onto amorphous polymer chains (amorphous resin chains). It is preferable since it simplifies the production process. In the first manufacturing method, since the amorphous polymer segment is formed in advance and then the crystalline polyester polymer segment is bonded, the orientation of the crystalline polyester polymer segment may be easily made uniform. Therefore, it is preferable from the viewpoint of reliably synthesizing a hybrid crystalline polyester resin suitable for the above-mentioned toner.

<1.1.2.2 Amorphous Resin>

The toner base particles according to the present invention preferably contain an amorphous resin in addition to a crystalline resin as the binder resin. Amorphous resin is a resin that does not have the aforementioned "crystallinity." By including amorphous resin in the toner base particles, the crystalline resin and amorphous resin are compatible with each other during heat fixing, thereby improving low-temperature fixability of the toner.

In other words, an amorphous resin is a resin that has no melting point (i.e., no clear endothermic peak when the temperature rises) and a relatively high glass transition temperature (Tg) in the endothermic curve obtained when differential scanning calorimetry (DSC) is performed.

In the present invention, the Tg of the amorphous resin is preferably in the range of 35 to 80° C., and more preferably in the range of 45 to 65° C.

From the viewpoint of achieving both low-temperature fixability, hot-offset resistance and heat resistance, it is preferable that the toner base particles have a core-shell structure. When particles of a mold release agent (wax)-containing amorphous resin (for example, a mold release agent-containing amorphous vinyl resin) having a three-layer structure are contained in the core portion of the core-shell structure, the Tg of the amorphous resin constituting the outermost layer of the particles is preferably in the range of 55 to 65° C.

The above glass transition temperature may be measured according to the method specified in ASTM D3418-82 (DSC method). For the measurement, a DSC-7 differential scanning calorimeter (manufactured by PerkinElmer Co., Ltd.), a TAC7/DX thermal analyzer controller (manufactured by PerkinElmer Co., Ltd.) may be used for measurement.

The weight average molecular weight (Mw) of the amorphous resin is preferably in the range of 20,000 to 150,000, and more preferably in the range of 25,000 to 130,000, from the viewpoint of plasticity. The number average molecular weight (Mn) of the amorphous resin is preferably in the range of 5,000 to 150,000, more preferably in the range of 8,000 to 70,000, from the viewpoint of plasticity. The molecular weight of amorphous resins may be measured in the same way as the method for measuring the molecular weight of crystalline resins described above.

The mass ratio of amorphous resin to crystalline resin (amorphous resin/crystalline resin) is preferably in the range of 98/2 to 80/20, and more preferably in the range of 95/5 to 80/20. By having the mass ratio within the above range, the crystalline resin is not exposed on the surface of the toner base particles, or even if it is exposed, the amount is extremely small, and enough amount of crystalline resin may be introduced into the toner particles to enable low-temperature fixability.

The amorphous resin is preferably used as a binder resin together with the crystalline resin described above to constitute the toner base particles. By containing the crystalline resin, appropriate fixed image strength and image gloss may be obtained, and good charging characteristics may be imparted even in an environment where temperature and humidity fluctuate.

When the toner base particles according to the present invention have a core-shell structure, from the viewpoint of controllability of the dispersion state in the toner base particles and charging characteristics, it is preferable that the amorphous vinyl resin and crystalline polyester resin constitute the core part, and the hybrid amorphous polyester resin constitutes the shell layer.

One type of amorphous resin may be used alone, or two or more may be used in combination. Examples of the amorphous resin include a vinyl resin, a urethane resin, a urea resin, and amorphous polyester resins such as a styrene-acrylic modified polyester resin. From the viewpoint of thermoplasticity, the amorphous resin preferably contains an amorphous vinyl resin (simply also referred to as a vinyl resin). These amorphous resins may be obtained by known synthetic methods or commercially available products.

Hereinafter, the vinyl resin will be described.

(Vinyl Resin)

The binder resin according to the present invention preferably contains a vinyl resin as a main component. By using vinyl resin as the main component, it is easy to adjust the compatibility and incompatibility between the crystalline resin and the amorphous resin. Since the crystalline polyester resin may maintain a finer dispersed state in the binder resin, particularly in the vinyl resin as the main component, the sharp melt property of the crystalline polyester resin is more exhibited at the time of fixing.

The content of vinyl resin is preferably 50 mass % or more, more preferably 70 mass % or more, and still more preferably 80 mass % or more, and particularly preferably 85 mass % or more, based on the total mass of the binder resin. By using vinyl resin as the main component (50 mass % or more of the total mass of the binder resin), it is easy to adjust the compatibility with the crystalline resin, and both low-temperature fixability and heat resistance may be achieved. Although the upper limit of the vinyl resin content is not particularly limited, 98 mass % or less is preferable, 95 mass % or less is more preferable, and 93 mass % or less is still more preferable.

It is preferable that the binder resin according to the present invention has a vinyl resin as its main component and also contains an amorphous polyester resin. This is because the inclusion of the amorphous polyester resin further facilitates adjustment of compatibility with the crystalline resin.

In addition, when the toner base particles have a core-shell structure, the amorphous polyester resin has better heat resistance than the vinyl resin. Therefore, by adding a shell layer using the amorphous polyester resin, both heat resistance and low-temperature fusing performance of the toner may be achieved. From this point of view, the content of the amorphous polyester resin is preferably in the range of 2 to 20 mass %, and more preferably in the range of 3 to 18 mass %, and still more preferably in the range of 4 to 15 mass % relative to the total mass of the binder resin.

In the present invention, vinyl resins are, for example, polymers of vinyl compounds, examples of which include an acrylic ester resin, a styrene-acrylic ester resin, and an ethylene-vinyl acetate resin. One type of these may be used alone, and two or more types may be used in combination. Of these, a styrene-acrylic ester resin (styrene-acrylic resin) is preferred from the viewpoint of plasticity during thermal fixing. The styrene monomer and the (meth)acrylic ester monomer used in the styrene-acrylic resin may be the same as those described in the "styrene monomer" and "(meth) acrylic ester monomer" items described above.

A styrene-acrylic resin is formed by the addition polymerization of at least a styrene monomer and a (meth)acrylic ester monomer. The styrene monomer includes styrene represented by the structural formula $CH_2{=}CH{-}C_6H_5$, as well as styrene derivatives having known side chains and functional groups in the styrene structure.

Examples of the (meth)acrylic acid ester monomer include an acrylic acid ester and a methacrylic acid ester represented by $CH(R_1){=}CHCOOR_2$ ($R_1$ represents a hydrogen atom or a methyl group, and $R_2$ represents an alkyl group with 1 to 24 carbon atoms), and further include acrylic acid ester derivatives and methacrylic acid ester derivatives having known side chains and functional groups in the structure.

Examples of the styrene monomer include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene.

Examples of the (meth)acrylic ester monomer include acrylic ester monomers such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, and phenyl acrylate; and methacrylic ester monomers such as methyl methacrylate, ethyl methacrylate, n-butyl methacrylate, isopropyl methacrylate, isobutyl methacrylate, ethyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate.

In this specification, "(meth)acrylic ester monomer" is a generic term for "acrylic ester monomer" and "methacrylic ester monomer," and means one or both of them. For example, "(meth)methyl acrylate" means one or both of "methyl acrylate" and "methyl methacrylate".

One type of the above (meth)acrylic ester monomer may be used alone, or two or more may be used in combination. For example, it is possible to form a copolymer using a styrene monomer and two or more acrylic ester monomers, to form a copolymer using a styrene monomer and two or more methacrylic ester monomers, and to form a copolymer using a styrene monomer in combination with an acrylic ester monomer and a methacrylic ester monomer.

From the viewpoint of plasticity, the content of the constituent unit derived from the styrene monomer is preferably in the range of 40 to 90 mass % relative to the total mass of the amorphous resin. The content of the constituent unit derived from the (meth)acrylic ester monomer is preferably in the range of 10 to 60 mass % relative to the total mass of the amorphous resin.

The amorphous resin may further contain constituent units derived from other monomers than the above styrene monomer and (meth)acrylic ester monomer. The other monomer may be a compound having an ester bond with a hydroxy group [—OH] derived from a polyhydric alcohol or a carboxy group [—COOH] derived from a polyhydric carboxylic acid. In other words, the amorphous resin is preferably a polymer that is capable of addition polymerization to the above styrene monomer and (meth)acrylic ester monomer, and in which an amphoteric compound (a compound having a carboxy group or a hydroxy group) is further polymerized.

The "amphoteric compound" in the present invention is monomer that combines a crystalline polyester polymer segments and an amorphous polymer segment. It is a monomer having intramolecular substituents such as a hydroxy group, a carboxy group, an epoxy group, a primary amino group, a and secondary amino group that can react with a crystalline polyester polymer segment, and an ethylenically unsaturated group that can react with an amorphous polymer segment. Among them, a vinyl carboxylic acid having a hydroxy group or a carboxy group and an ethylenically unsaturated group is preferred.

Examples of the amphoteric compound include compounds having a carboxy group such as acrylic acid, methacrylic acid, maleic acid, itaconic acid, fumaric acid, maleic acid monoalkyl ester, and itaconic acid monoalkyl ester; and compounds having a hydroxy group such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and polyethylene glycol mono (meth)acrylate.

The content of the constituent unit derived from the above amphoteric compound is preferably in the range of 0.5 to 20 mass % relative to the total mass of the amorphous resin.

The above styrene-acrylic resins may be synthesized by polymerizing monomers using known oil-soluble or water-soluble polymerization initiators. Examples of oil-soluble polymerization initiators include azo or diazo polymerization initiators, and peroxide polymerization initiators. Specifically, the method is the same as the method for forming styrene-acrylic polymer segments described above, and is therefore not described here.

The weight average molecular weight (Mw) of the amorphous vinyl resin is preferably in the range of 20,000 to 150,000, and the number average molecular weight (Mn) is preferably in the range of 5,000 to 15,000 from the viewpoint of achieving low-temperature fixability and hot-offset resistance. The weight average molecular weight (Mw) and the number average molecular weight (Mn) may be measured in the same way as in the case of the crystalline resin described above.

The glass transition temperature (Tg) of the amorphous vinyl resin is preferably in the range of 35 to 80° C. from the viewpoint of both fixing performance and hot-offset resistance. The glass transition temperature may be measured in the same way as in the case of the amorphous resins described above.

(Hybrid Amorphous Polyester Resin)

It is preferable that the binder resin according to the present invention contains a hybrid amorphous polyester resin in order to obtain adequate compatibility when used in combination with an amorphous vinyl resin, and from the viewpoint of shape controllability of the toner base particles and fixed image strength. The inclusion of the hybrid amorphous polyester resin makes it easier to adjust compatibility, incompatibility and crystallization. The hybrid amorphous polyester resin may also be said to be a partially modified amorphous polyester resin.

The weight average molecular weight (Mw) of the hybrid amorphous polyester resin is preferably in the range of 20,000 to 50,000. Within the above range, compatibility-incompatibility and crystallization may be adjusted more easily. The number average molecular weight (Mn) of the hybrid amorphous polyester resin is preferably in the range of 3,000 to 12,500. The molecular weight may be measured in the same way as for the crystalline resins described above.

The hybrid amorphous polyester resin is a resin in which an amorphous polyester polymer segment is chemically bonded to an amorphous polymer segment other than the amorphous polyester, preferably an amorphous vinyl polymer segment.

The amorphous polyester polymer segment refers to a portion derived from the amorphous polyester resin. In other words, it refers to a molecular chain with the same chemical structure as that which constitutes the amorphous polyester resin. The amorphous polymer segment other than amorphous polyester refers to a portion derived from amorphous resins other than amorphous polyester resin. Examples of the amorphous resin other than amorphous polyester resins include a vinyl resin such as a styrene-acrylic resin, a urethane resin, and a urea resin. One type of amorphous polymer segment other than amorphous polyester may be used alone, or two or more may be used in combination.

Therefore, a suitable amorphous vinyl polymer segment refers to a portion derived from an amorphous vinyl resin. In other words, it refers to a molecular chain with the same chemical structure as that which constitutes the amorphous vinyl resin.

The hybrid amorphous polyester resin may be in any form, such as a block copolymer or a graft copolymer, as long as it contains an amorphous polyester polymer segment and an amorphous polymer segment other than the amorphous polyester, especially an amorphous vinyl polymer segment. However, a graft copolymer is preferred. By using a graft copolymer, it is possible to achieve both low-temperature fixability, hot-offset resistance, and mold release separation.

Furthermore, from the above point of view, it is preferable that the amorphous polyester polymer segment is a grafted structure with an amorphous polymer segment other than the amorphous polyester, especially an amorphous vinyl polymer segment, as the main chain. That is, the hybrid amorphous polyester resin is preferably a graft copolymer having an amorphous polymer segment other than amorphous polyester, especially an amorphous vinyl polymer segment, as the main chain and an amorphous polyester polymer segment as the side chain.

The content of the hybrid amorphous polyester resin is preferably in the range of 3 to 20 mass %, and more preferably in the range of 5 to 15 mass % of the total mass of the binder resin.

(Amorphous Polyester Polymer Segment)

The amorphous polyester polymer segment is a portion derived from a known polyester resin obtained by polycondensation reaction between a divalent or higher carboxylic acid (polyvalent carboxylic acid component) and a divalent or higher alcohol (polyhydric alcohol component). It is a polymer segment for which no clear endothermic peak is observed in DSC.

The amorphous polyester polymer segment is not particularly limited as long as it is as defined above. For example, a resin having a structure in which a main chain made of an amorphous polyester polymer segment is copolymerized with another component, and a resin having a structure in which an amorphous polyester polymer segment is copolymerized with a main chain composed of other components are described above, they fall under the category of a hybrid amorphous polyester resin having an amorphous polyester polymer segment in the present invention when a clear heat absorption peak is not observed in DSC.

(Polyvalent Carboxylic Acid Component)

Examples of the polyvalent carboxylic acid component include: dicarboxylic acids such as oxalic acid, succinic acid, maleic acid, adipic acid, D-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-dicarboxylic acid, malic acid, citric acid, hexahydroterephthalic acid, malonic acid, pimelic acid, tartaric acid, mucic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediglycolic acid, p-phenylenediglycolic acid, o diphenylacetic acid, diphenyl-p,p'-dicarboxylic acid, naphthalene-1,4-dicarboxylic acid 1,4-dicarboxylic acid, naphthalene-1,5-dicarboxylic acid, naphthalene-2,6-dicarboxylic acid Dicarboxylic acids such as naphthalene-1,4-dicarboxylic acid, naphthalene-1,5-dicarboxylic acid, naphthalene-2,6-dicarboxylic acid, anthracenedicarboxylic acid, and dodecenyl succinic acid; trimellitic acid, pyromellitic acid, naphthalene tricarboxylic acid, naphthalene tetracarboxylic acid, pyrene tricarboxylic acid, and pyrene dicarboxylic acid, pyrene tricarboxylic acid, and pyrene tetracarboxylic acid, One type of these polyvalent carboxylic acids may be used alone, or two or more may be used in combination.

Among these, it is preferable to use aliphatic unsaturated dicarboxylic acids such as fumaric acid, maleic acid, and mesaconic acid, and aromatic dicarboxylic acids such as isophthalic acid and terephthalic acid, succinic acid, and trimellitic acid, from the viewpoint that it is easier to obtain the effects of the invention.

(Polyhydric Alcohol Component)

Examples of the polyhydric alcohol component includes divalent alcohols such as ethylene glycol, propylene glycol, butanediol, diethylene glycol, hexanediol, cyclohexanediol, octanediol, decanediol, dodecanediol, ethylene oxide adducts of bisphenol A, propylene oxide adducts of bisphenol A; trivalent or higher polyols such as glycerin, pentaerythritol, hexamethylol melamine, hexaethylol melamine, tetramethylol benzoguanamine, and tetraethylol benzoguanamine. One type of these polyhydric alcohol components may be used alone, or two or more may be used in combination.

Among these, divalent alcohols such as an ethylene oxide adduct of bisphenol A and a propylene oxide adduct of bisphenol A are preferred from the viewpoint of ease of obtaining the effects of the present invention.

The ratio of the polyvalent carboxylic acid component to the polyhydric alcohol component above is determined by the equivalent ratio of the hydroxy group [—OH] of the polyhydric alcohol component to the carboxy group [—COOH] of the polyvalent carboxylic acid component. It is preferable to be in the range of 1.5/1 to 1/1.5, and more preferable to be in the range of 1.2/1 to 1/1.2. When the used ratio of the polyhydric alcohol component to the polyhydric carboxylic acid component is within the above range, it is easier to control the acid number and molecular weight of the amorphous polyester resin.

The method of forming the amorphous polyester polymer segment is not particularly limited. It may be formed by polycondensation (esterification) of the above polyvalent carboxylic acid and polyhydric alcohol components using a known esterification catalyst.

The catalysts that may be used in the production of the amorphous polyester polymer segment are the same as those described in the item (crystalline resins) above, and are therefore not described here.

The polymerization temperature is not particularly limited, but it is preferably in the range of 150 to 250° C. The polymerization time is not particularly limited, but it is preferably in the range of 0.5 to 10 hours. During polymerization, the reaction system may be depressurized as necessary.

The content of the amorphous polyester polymer segment in the hybrid amorphous polyester resin is preferably in the range of 50 to 99.9 mass %, and more preferably in the range of 70 to 95 mass % relative to the total mass of the hybrid amorphous polyester resin. By being within the above range, both heat resistance and low-temperature fixability may be achieved. The constituent components and content of each polymer segment in the hybrid amorphous polyester resin may be specified, for example, by NMR measurement and methylation reaction Py-GC/MS measurement.

Substituents such as a sulfonic acid group, a carboxy group, and a urethane group may be further introduced into the hybrid amorphous polyester resin. The introduction of the above substituents may be in the amorphous polyester polymer segment or in the amorphous vinyl polymer segment as described in detail below.

(Amorphous Polymer Segment)

In the present invention, an amorphous polymer segment other than an amorphous polyester polymer segment are also referred to simply as an "amorphous polymer segment. The amorphous polymer segment (in particular, the amorphous vinyl polymer segment) may control the compatibility between the amorphous vinyl resin and the hybrid amorphous polyester resin when the amorphous vinyl resin is included in the binder resin.

The presence of the amorphous polymer segment in the hybrid amorphous polyester resin (and even in the toner) may be confirmed, for example, by identifying the chemical structure using NMR measurements and methylation reaction Py-GC/MS measurement.

The amorphous polymer segment has no melting point and a relatively high glass transition point (Tg) when differential scanning calorimetry (DSC) is performed on a resin with the same chemical structure and molecular weight as the amorphous polymer segment. For resins having the same chemical structure and molecular weight as the amorphous polymer segment, the glass transition temperature (Tg) is preferably in the range of 35 to 80° C., and more preferably in the range of 45 to 65° C.

In the above hybrid amorphous polyester resin, it is preferable to replace a part of the amorphous polyester polymer segment with an amorphous polymer segment and to have a structure in which the amorphous polyester polymer segment and the amorphous polymer segment are combined. For example, a resin having a structure in which another component is copolymerized into a main chain made of a polymer in which an amorphous polyester polymer segment and an amorphous polymer segment are bonded, and a resin having a structure in which a polymer in which an amorphous polyester polymer segment and an amorphous polymer segment are bonded is copolymerized into a main chain made of another component falls under the category of a hybrid amorphous polyester resin having an amorphous polymer segment in the present invention.

The amorphous polymer segment is not particularly limited. Examples thereof include those obtained by polymerizing vinyl compounds, those obtained by polymerizing polyol and isocyanate components, and those obtained by polymerizing urea and formaldehyde. Among them, amorphous vinyl polymer segments obtained by polymerizing vinyl compounds are preferred. Examples of the segment are acrylic ester polymer segments, styrene-acrylic ester polymer segments, and ethylene-vinyl acetate polymer segments. One type of these may be used alone, and two or more types may be used in combination.

Among the above vinyl polymer segments, the styrene-acrylic ester polymer segment (styrene-acrylic polymer segment) is preferred in consideration of its plasticity during heat fixing. Since the suitable form of the amorphous vinyl resin is a styrene-acrylic resin, it is preferable that the amorphous vinyl polymer segment is also a styrene-acrylic polymer segment. This form of the hybrid amorphous polyester resin improves the compatibility between the hybrid amorphous polyester resin and the amorphous vinyl resin, making it easier to control the shape of the toner base particles.

The monomers used to form the styrene-acrylic polymer segments and the formation method are the same as those described in the "styrene-acrylic polymer segments" item in the section on hybrid crystalline polyester resins above, so they are not described here.

The content of the amorphous polymer segment in the hybrid amorphous polyester resin is preferably in the range of 0.1 to 50 mass %, and more preferably in the range of 5 to 30 mass % relative to the total mass of the hybrid amorphous polyester resin. By being within the above range, compatibility with the amorphous resin in the binder resin becomes higher, and both low-temperature fixability, hot-offset resistance and heat resistance may be achieved.

The production method of the hybrid amorphous polyester resin is not limited to any method as long as it may form a polymer that combines the above amorphous polyester polymer segment with an amorphous polymer segment. Specific manufacturing methods of the hybrid amorphous polyester resin include, for example, the following methods.

(1) A method for producing a hybrid amorphous polyester resin by polymerizing an amorphous polymerized segment in advance, and then performing a polymerization reaction to form an amorphous polyester polymerized segment in the presence of the amorphous polymerized segment.

(2) A method of forming an amorphous polyester polymer segment and an amorphous polymer segment, respectively, and then combining them to produce a hybrid amorphous polyester resin.

(3) A method of producing a hybrid amorphous polyester resin by forming an amorphous polyester polymer segment in advance, and then conducting a polymerization reaction to form an amorphous polymer segment in the presence of the amorphous polyester polymer segment.

Among the formation methods (1) to (3) described above, the method (1) is preferred because it is easy to form hybrid amorphous polyester resin, which is a structure in which an amorphous polyester polymer segment is grafted onto an amorphous polymer segment, and the method (1) is preferable from the viewpoint of simplifying the production process.

In addition, the toner base particles may contain internal additives such as a colorant, a mold release agent, and a charge control agents, as needed.

<1.1.3 Colorant>

The magnetic material according to the present invention may also function as a colorant, but conventionally used colorants may also be used in combination. As a colorant, carbon black, dyes, and pigments may be used as desired. As carbon black, channel black, furnace black, acetylene black, thermal black, and lamp black may be used. Magnetic materials may also be used as colorants.

Specific examples of a white colorant include inorganic pigments (e.g., heavy calcium carbonate, light calcium carbonate, titanium dioxide, aluminum hydroxide, titanium white, talc, calcium sulfate, barium sulfate, zinc oxide, magnesium oxide, magnesium carbonate, amorphous silica Colloidal silica, white carbon, kaolin, calcined kaolin, delaminated kaolin, aluminosilicate, sericite, bentonite, and smectite), and organic pigments (e.g., polystyrene resin particles, urea formalin resin particles). Pigments with a hollow structure, such as hollow resin particles, and hollow silica are also mentioned. From the standpoint of chargeability and opacity, the white colorant is preferably titanium dioxide. Any crystal structure of titanium dioxide may be used, such as anatase, rutile, and brookite type.

The average particle diameter of the white colorant is preferably in the range of 10 to 1,000 nm, and more preferably in the range of 50 to 500 nm. Surface treatment may also be applied to provide dispersibility.

As a black colorant, for example, carbon black such as furnace black, channel black, acetylene black, thermal black, and lamp black, and magnetic powder such as magnetite and ferrite are also used.

As a colorant for magenta or red, examples thereof include: C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48; 1, C.I. Pigment Red 53; 1, C.I. Pigment Red 57; 1, C.I. Pigment Red 122, C.I. Pigment Red 123, C.I. Pigment Red 139, C.I. Pigment Red 144, C.I. Pigment Red 149, C.I. Pigment Red 150, C.I. Pigment Red 166, C.I. Pigment Red 177, C.I. Pigment Red 178, Pigment Red 184, C.I. Pigment, and C.I. Pigment Red 222.

As a colorant for orange or yellow, examples thereof include: C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 138, C.I. Pigment Yellow 155, C.I. Pigment Yellow 180, and C.I. Pigment Yellow 185.

Further, as a colorant for green or cyan, examples thereof include: C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Blue 62, C.I. Pigment Blue 66, and C.I. Pigment Green 7.

One type of these may be used alone, and two or more may be used in combination.

The average particle diameter of colored colorants other than white is preferably in the range of 10 to 1,000 nm, and more preferably in the range of 50 to 500 nm.

The content of the colorant is preferably in the range of 1 to 60 mass % of the total mass of the toner base particles, and more preferably it is in the range of 2 to 25 mass %. Within the above range, the color reproducibility of images may be ensured.

<1.1.4 Mold Release Agent>

The toner of the present invention preferably contains a mold release agent (wax). Any known mold release agent may be used. Examples of the mold release agent include polyolefin waxes such as polyethylene wax and polypropylene wax; branched chain hydrocarbon waxes such as microcrystalline wax; long chain hydrocarbon waxes such as paraffin wax, sazole wax, and Fischer-Tropsch wax; dialkyl ketone waxes such as distearyl ketone; ester waxes such as carnauba wax, montan wax, behenyl behenate (behenic acid behenyl ester), trimethylolpropane tribehenate, pentaerythritol tetrabehenate, pentaerythritol diacetate dibehenate, glycerin tribehenate, 1,18-octadecanediol distearate, tristearyl trimellitate, distearyl maleate, polyglycerol esters of fatty acids; and amide waxes such as ethylenediamine behenylamide, and tristearyl trimellitate.

The above waxes are easily compatible with amorphous resins. Therefore, due to the plasticizing effect of the wax, the sharp melt property of the toner particles may be improved, and low-temperature fixability may be improved. From the viewpoint of improving the low-temperature fixability more, it is preferable that the wax is an ester-based wax (ester-based compound), and from the viewpoint of achieving both heat resistance and low-temperature fixability, it is more preferable that the wax is a linear ester-based wax (linear ester-based compound). One type of these waxes may be used alone, and two or more types may be used in combination.

The melting point of the wax is preferably in the range of 40 to 160° C., more preferably in the range of 50 to 120° C., and still more preferably in the range of 70 to 80° C., from the viewpoint of sufficient heat storage, low-temperature fixability and mold release properties. When the melting point of the wax is within the above range, the heat-resistant storage property of the toner is ensured and stable toner images may be obtained without causing cold-offset, even when the toner is fixed at a low temperature. The melting point of the mold release agent may be measured in the same way as the method for measuring the temperature of the peak top of the endothermic peak (melting point) described above.

The content of the mold release agent in the toner base particle is preferably in the range of 3 to 15 mass % relative to the total mass of the binder resin in the toner base particle. By being within the above range, both hot-offset resistance and mold release properties may be achieved. When the content of the mold release agent is 3 mass % or more, sufficient mold release property may be obtained, and when it is 15 mass % or less, sufficient heat resistance may be obtained.

<1.1.5 Charge Control Agent>

The toner of the present invention is preferred to contain a charge control agent. The toner of the present invention is a magnetic toner and is preferably a negatively charged toner. As a charge control agent for negative charging, there are no particular limitations, but it is preferable to use organometallic complex compounds or chelating compounds. Examples include monoazo metal complex compounds, acetylacetone metal complex compounds, and metal complex compounds of aromatic hydroxycarboxylic acids or aromatic dicarboxylic acids.

Commercial products may also be used. Examples thereof include compounds such as Spilon™ Black TRH, T-77, T-95 (manufactured by Hodogaya Chemical Industry Co., Ltd.), and BONTRON™ 5-34, S-44, S-54, E-84, E-88, E-89 (manufactured by Orient Chemical Industries Co., Ltd.). One type of charge control agent may be used alone, and two or more types may be used in combination.

From the viewpoint of the amount of charge, the content of the charge control agent is preferably in the range of 0.1 to 10 mass %, and more preferably in the range of 0.1 to 5 mass % based on the total mass of the binder resin in the toner base particle.

<1.1.6 Structure and Shape of Toner Base Particles>

(Structure of Toner Base Particles)

The structure of the toner base particles according to the present invention is not particularly limited and may be a so-called monolayer structure or a core-shell structure. The core-shell structure is preferable from the viewpoint of both suppressing charge attenuation, low-temperature fixability, hot-offset resistance, and heat-resistant storage.

An example of the core-shell structure is shown below. The core part contains at least a binder resin and a magnetic material, and may also contain other additives (internal additives) such as a mold release agent, if necessary. The shell layer contains an amorphous resin.

Specifically, the core section is preferably composed of a binder resin containing an amorphous vinyl resin and a crystalline polyester resin, a magnetic material, and an internal additive such as a mold release agent, while the shell layer is preferably composed of a hybrid amorphous polyester resin.

The core-shell structure is not limited to a structure in which the shell layer completely covers the surface of the particles in the core part, but also includes, for example, a structure in which the shell layer does not completely cover the surface of the particles in the core part, and the surface of the particles in the core part is exposed in some places.

From the viewpoint of improving the chargeability under high temperature and high humidity environments, it is preferable that the crystalline resin is not exposed on the surface, but is contained inside the toner base particles, while the amorphous resin is exposed on the surface of the toner base particles. Such a form may be controlled by the timing of addition of each resin when producing toner base particles by the emulsion aggregation method.

The morphology of the toner base particles, i.e., the cross-sectional structure of the core-shell structure and the position of the crystalline polyester resin, may be confirmed using known means such as transmission electron microscopy (TEM) and scanning probe microscopy (SPM).

(Particle Diameter of Toner Base Particles)

The particle diameter of the toner base particles is preferably in the range of 3 to 10 μm in terms of median diameter (D50) on a volume basis. Within the above range, the reproducibility of fine lines is high, a high-quality image may be obtained, and toner fluidity may be ensured.

The volume based median diameter (D50) of the toner base particles may be determined, for example, by using a Coulter Multisizer 3 (manufactured by Beckman Coulter Corporation) connected to a computer system for data processing.

The median diameter of the toner base particles on a volume basis may be controlled by the concentration of coagulant and the amount of solvent added or the fusion time in the coagulation and fusion step during toner production described below, as well as the composition of the resin component.

(Average Circularity of Toner Base Particles)

From the viewpoint of low-temperature fixability, the average circularity of the toner base particles is preferably in the range of 0.920 to 1.000, and more preferably in the range of 0.940 to 0.995.

The average circularity of the toner base particles is measured and calculated using, for example, "FPIA-2100" (manufactured by Sysmex Corporation). Specifically, the toner base particles are wetted in a surfactant solution and dispersed by ultrasonic dispersion for one minute. After dispersion, the toner base particles are measured using the FPIA-2100 in the HPF (high magnification imaging) mode with an appropriate concentration of 4000 HPF detections. Circularity is calculated by the following formula.

Circularity=(Circumference of a circle with the same projected area as the particle image)/(Circumference of the particle projection image)

The average circularity is the arithmetic mean value obtained by adding up the circularity of each particle and dividing it by the total number of particles measured.

The surface of the toner base particles is uneven, and the concave areas are relatively close to the magnetic material and the surface of the toner base particles. Therefore, it is necessary to prevent the magnetic material from being exposed on the surface of the toner particles by covering it with an external additive. The strontium titanate particles according to the present invention may move freely while adhering to the surface of the toner base particles, and as a result, they may easily gather in the recesses and prevent the magnetic material from being exposed on the surface of the toner particles.

[1.2 External Additive]

The electrostatic charge image developing toner of the present invention is characterized in that it contains strontium titanate particles doped with metal elements other than titanium and strontium as an external additive. The external additive is added from the viewpoint of improving the charging performance of the toner particles, fluidity, and cleanability, and is attached to the surface of the toner base particles.

As the external additive according to the present invention, a conventionally known external additive may be used in combination with strontium titanate particles doped with metal elements other than titanium and strontium.

Since the toner particles are charged and may be moved to the photosensitive drum or the recording medium, it is necessary to keep the charged amount. However, since the toner of the present invention generally contains a magnetic material with low electrical resistance, the use of an external additive may prevent the magnetic material from being exposed to the surface of the toner particles, thereby suppressing charge decay.

Therefore, it is necessary to use an external additive with high electrical resistance, but the surface of the toner particles containing the external additive must be charged because the toner particles need to move and adhere by electrostatic force. In other words, the external additive is preferably to have high resistance and high ferroelectricity. Further, it is preferable that the external additive interacts with the magnetic material and suppresses the magnetic material from being exposed on the surface of the toner particles.

The content of the external additive is preferably 0.1 to 10 mass % of the total mass of toner particles (toner base particles and external additive). Various known mixing devices such as a turbulence mixer, a Henschel mixer, a Nauta mixer, and a V-type mixer may be used as equipment for attaching the external additives listed below to the toner base particles.

<1.2.1 Strontium Titanate>

Strontium titanate is a composite oxide of strontium and titanium, which has a perovskite structure. Such perovskite-type oxides are described as $ABO_3$ in the formula, and the A site contains divalent elements such as Ca, Sr, Ba, and Pb, while the B site contains tetravalent elements such as Ti, Zr, and Sn.

Since strontium titanate has a perovskite structure, it has high crystallinity and high resistance. In addition, each ion, which is regularly aligned, is slightly displaced, resulting in polarization and ferroelectricity.

However, due to their high crystallinity, strontium titanate particles tend to take cubic or rectangular shapes, making it difficult for them to adhere to the toner base particles as external additives. Therefore, by doping metal elements other than titanium and strontium and changing the crystal structure, the crystallinity is reduced and a rounded shape. That is, particles with a small diameter and high circularity may be obtained.

Because of its high crystallinity, strontium titanate particle has a higher density than that of the resin used for the binder resin, so it tends to be buried in the toner base particles, but the interaction with the magnetic material prevents the burial.

By doping metal elements and changing the crystal structure, the polarization state within the crystal also changes, but by adjusting the particle size, sufficient dielectric properties may be obtained as an external additive.

The metallic elements used are not limited to those other than titanium and strontium. It is preferable that the metallic elements have an ionic radius that may enter the crystal structure of strontium titanate when ionized. From this point of view, it is preferable that the metal element has an ionic radius in the range of 40 to 200 pm when ionized, and more preferably in the range of 60 to 150 pm.

Examples of the metallic element include lanthanoid, silicon, aluminum, calcium, magnesium, barium, phosphorus, sulfur, calcium, vanadium, chromium, manganese, iron, cobalt, nickel, copper, gallium, yttrium, zinc, niobium, molybdenum, ruthenium, rhodium, palladium, silver, indium, tin, antimony, barium, tantalum, tungsten, rhenium, osmium, iridium, platinum, bismuth, yttrium, zirconium, niobium, silver, and tin. As lanthanoid, lanthanum and cerium are preferred. Among these, lanthanum is preferred from the viewpoint that it is easy to dope and control the shape of strontium titanate particles.

From the viewpoint of being able to control the volume resistance and capacitance values, the metal element preferably has an electro negativity of less than 2, more preferably less than 1.3, and still more preferably less than 1.3 in terms of the Allred-Rochow value. Metal elements with an electro negativity of 2.0 or less include lanthanum (1.08), magnesium (1.23), aluminum (1.47), silica (1.74), calcium (1.04), vanadium (1.45), chromium (1.56), manganese (1.60), iron (1.64), cobalt (1.70), nickel (1.75), copper (1.75), zinc (1.66), gallium (1.82), yttrium (1.11), zirconium (1.22), niobium (1.23), silver (1.42), indium (1.49), tin (1.72), barium (0.97), tantalum (1.33), rhenium (1.46), and cerium (1.06).

From the viewpoint of achieving a rounded shape while having a perovskite-type crystal structure, the amount of metallic elements in the strontium titanate particles relative to strontium is preferably in the range of 0.1 to 20 mol %, more preferably in the range of 0.1 to 15 mol %, and still more preferably in the range of 0.1 to 10 mol %.

(Number Average Primary Particle Diameter of Strontium Titanate)

In the present invention, the number average primary particle diameter of strontium titanate particles is a diameter of a circle having the same area as the primary particle image (the so-called circle equivalent diameter). The number average primary particle diameter of strontium titanate particles is a particle size that is 50% cumulative from the small diameter side in the number-based distribution of primary particles.

The strontium titanate particles according to the present invention preferably has a number average primary particle diameter in the range of 20 to 300 nm, and more preferably in the range of 20 to 100 nm. When it is 20 nm or more, the effect as a charge control agent is fully exhibited, and when it is 300 nm or less, the specific surface area is sufficiently large and the concealment rate of the surface of the toner base particles by the external additive may be increased.

The number average primary particle diameter of strontium titanate particles is measured, for example, by the following method.

After strontium titanate particles are externally added (dispersed) to the toner base particles, 100 primary strontium titanate particles are observed with a scanning electron microscope "JSM-7401F" (JEOL) at a magnification of 40,000. The longest and shortest diameters of each particle are measured by image analysis of the primary particles, and the equivalent diameter is measured from the intermediate value. The average of 100 measured primary particle diameters is then used as the average primary particle diameter.

The number average primary particle diameter of strontium titanate particles may be controlled, for example, by various conditions during the wet process of producing strontium titanate particles.

(Average Circularity of Strontium Titanate)

In the present invention, the average circularity of strontium titanate particles is the value obtained by dividing the circumference of a circle having the same area as the primary particle image (so-called circle equivalent circumference) by the circumference of the primary particle image. The average circularity of strontium titanate particles is the arithmetic mean of the circularity of each primary particle added together and divided by the total number of particles measured. A circularity of 1.0 means that the particle is a true sphere, while a lower value means that the particle has an uneven surface and a higher degree of irregularity.

The strontium titanate particles according to the present invention preferably has an average circularity of the primary particles in the range of 0.82 to 0.94. A roundness of 0.82 or more makes it difficult to be detached from the toner base particles, and a roundness of 0.94 or less limits movement on the surface of the toner base particles and maintains dispersibility. In this way, the dispersibility may be maintained.

The average circularity of strontium titanate primary particles is measured, for example, by the following method.

One hundred primary particles of strontium titanate are examined under a scanning electron microscope "JSM-7401F Scanning Electron Microscope "JSM-7401F" (JEOL Co., Ltd.) at a magnification of 40000. The photographic images are scanned and analyzed using the LUZEX™ AP image processing and analysis system (Nireco Corporation). From the analyzed image, the perimeter of the circle with the same projected area as the particle image and the perimeter of the particle projection image are determined, and the circularity is calculated using the following formula. The average circularity is calculated by adding the circularity of each particle together and dividing by the total number of particles measured.

$$\text{Circularity}=(\text{Circumference of a circle with the same projected area as the particle image})/(\text{Circumference of the particle projection image})=[2\times(A\pi)^{1/2}]/PM$$

In the above equation, A is the projected area of strontium titanate particle and PM is the perimeter length of strontium titanate particle.

(Hydrophobic Treated Surface)

The strontium titanate particles according to the present invention may have a hydrophobic treated surface, which may increase the electrical resistance and prevent the charged charge of the toner from leaking (leakage).

The hydrophobized surface of strontium titanate particles is preferably surface-treated with a silicon-containing organic compound from the viewpoint of increasing resistance. The silicon-containing organic compounds include an alkoxysilane compound, a silazane compound, and a silicone oil. Among them, it is preferable that it is at least one selected from the group consisting of an alkoxysilane compound and a silicone oil.

Examples of the alkoxysilane compound, which is a silicon-containing organic compound, include: tetramethoxysilane, tetraethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, dimethyldimethoxysilane, dimethyldiethoxysilane, methylvinyldimethoxysilane, methylvinyldiethoxysilane, diphenyldimethoxysilane, diphenyldiethoxysilane, trimethymethoxysilane, and trimethylethoxysilane.

Examples of the silazane compound, which is a silicone-containing organic compound, include: dimethyl disilazane, trimethyl disilazane, tetramethyl disilazane, pentamethyl disilazane, and hexamethyl disilazane.

Examples of the silicone oil compound, which is a silicone-containing organic compound, include: silicone oils such as dimethyl polysiloxane, diphenyl polysiloxane, and phenyl methyl polysiloxane; and reactive silicone oils such as amino-modified polysiloxane, epoxy-modified polysiloxane, carboxyl-modified polysiloxane, carbinol modified polysiloxane, fluorine modified polysiloxane, methacrylate modified polysiloxane, mercapto modified polysiloxane, and phenol modified polysiloxane.

Among these, as the silicon-containing organic compound, an alkoxysilane compound is preferably used from the viewpoint of improving the charging environment difference and fluidity, and butyltrimethoxysilane is particularly preferable from the viewpoint of obtaining a charging environment difference.

The hydrophobized surface of the specific strontium titanate particles has a silicon (Si) to strontium (Sr) mass ratio (Si/Sr) of 0.025 to 0.25, calculated from qualitative and quantitative analysis of X-ray fluorescence analysis, from the viewpoint of preventing fluctuations in the resistance value of the particle surface. It is more preferable that the ratio is 0.05 to 0.20.

Here, X-ray fluorescence analysis of the hydrophobized surface of the specific strontium titanate particles is performed by the following method.

That is, using a fluorescent X-ray analyzer (XRF1500 manufactured by Shimadzu Corporation), qualitative and quantitative analysis measurement are performed under the conditions of X-ray output 40V, 70 mA, measurement area 10 mmw, and measurement time 15 minutes. Here, the elements to be analyzed are oxygen (O), silicon (Si), titanium (Ti), strontium (Sr), and metal elements other than titanium and strontium (Me). The mass ratio (%) of each element is calculated from the total amount of each element measured by referring to the calibration curve data that may quantify each element separately prepared.

Based on the value of silicon (Si) mass ratio and strontium (Sr) mass ratio obtained from this measurement, the mass ratio (Si/Sr) is calculated.

(Moisture Content)

The moisture content of strontium titanate particles according to the present invention is preferably in the range of 1.5 to 10 mass %, and more preferably in the range of 2 to 5 mass %, from the viewpoint that it is easy to narrow the charge distribution of the toner and to suppress the leakage of the charged charge of the toner.

The moisture content of strontium titanate particles may be measured as follows.

A 20 mg sample is placed in a chamber at a temperature of 22° C. and relative humidity of 55% for 17 hours to control the humidity, and then it is measured in a room at a temperature of 22° C. and relative humidity of 55%. Using a thermal balance (TGA-50 type manufactured by Shimadzu Corporation), the sample is heated from 30° C. to 250° C. in a nitrogen gas atmosphere at a temperature rise rate of 30° C./min, and the weight loss (mass lost by heating) is measured. The loss on heating (mass lost due to heating) is measured. The moisture content is then calculated using the following formula based on the measured loss on heating.

Moisture content(mass %)=(Loss on heating from 30° C. to 250° C.)/(Mass before heating after humidity control)×100

The moisture content of strontium titanate particles may be controlled by producing strontium titanate particles by a wet manufacturing method, various conditions during the wet manufacturing method, the type of hydrophobizing agent, and the amount of hydrophobizing treatment.

It is preferable that the content of strontium titanate particles is in the range of 0.1 to 5 mass % of the total mass of the toner particles (toner base particles and external additive), and more preferably to be in the range of 0.5 to 3 mass %, and particularly preferably to be in the range of 0.7 to 2 mass %.

<1.2.2 Other External Additives>

In addition to strontium titanate particles, the external additive according to the present invention may be combined with conventionally known inorganic particles, organic particles, and lubricants.

Examples of the inorganic particles include silica, sol-gel silica, titania, and alumina. These inorganic particles may be hydrophobically treated with a surface treatment agent such as a known silane coupling agent or silicone oil, if necessary. The size of the inorganic particles is preferably in the range of 2 to 50 nm in terms of number average primary particle diameter, and more preferably in the range of 7 to 30 nm.

As the organic particles, homopolymers such as styrene and methyl methacrylate and organic particles made of these copolymers may be used. The size of the organic particles is preferably in the range of 10 to 2,000 nm in terms of the number average primary particle diameter, and the shape of the particles is preferably spherical.

The number average primary particle diameter of the inorganic particles and the organic particles may be calculated by using an electron micrograph as in the case of strontium titanate particles. For example, the particle diameter may be determined by image processing of images taken with a transmission electron microscope. Alternatively, a 30,000 magnified photograph of the toner sample is taken with a scanning electron microscope, and the photographic image is captured with a scanner, and processed using LUZEX™ (AP (manufactured by Nireco Co., Ltd.). The image of the external additives are binarized, and the horizontal Feret diameters of 100 external additives are calculated for each type of external additive, and the average value may be determined as the number average primary particle diameter.

Preferably, the volume average particle diameter measured by a laser diffraction/scattering particle size distribution measuring device, for example, "LA-750" (manufactured by Horiba Seisakusho Co., Ltd.), and the inorganic particles and organic particles measured by an electron microscope may be compared with the average particle size and confirm that the values match. Further, by confirming that the aggregation of the inorganic particles and the organic particles does not occur, it can be determined that the average particle size is the particle size of the primary particles. The average primary particle diameter of the number of inorganic particles and organic particles may be adjusted by, for example, classification or mixing of classified products.

A lubricants is used to further improve cleaning and transfer properties. Examples thereof include zinc, aluminum, copper, magnesium, calcium and other salts of stearic acid; zinc, manganese, iron, copper, magnesium and other salts of oleic acid; zinc, copper, magnesium, calcium and other salts of palmitic acid; zinc, calcium and other salts of linoleic acid; zinc, calcium and other salts of ricinoleic acid; and calcium and other salts, and other metal salts of higher fatty acids. The size of the particles of the lubricant is preferably in the range of 0.3 to 20 μm in volume average particle diameter, and more preferably in the range of 0.5 to 10 μm. The volume average particle diameter of the lubricant is measured according to JIS Z8825-1-2013.

The content of the external additive used in addition to strontium titanate particles is preferably 15 mass % or less, more preferably in the range of 3 to 10 mass %, and still more preferable in the range of 4 to 8 mass %.

[1.3 Manufacturing Method of Electrostatic Charge Image Developing Toner]

(Manufacturing Method of Toner Base Particles)

The method of producing toner base particles is not particularly limited. Examples thereof includes known methods such as a kneading and pulverizing method, a suspension polymerization method, a emulsion aggregation method, a dissolution and suspension method, a polyester elongation method, and a dispersion polymerization method.

Among these, the emulsion aggregation method is preferable in terms of uniformity of particle size, controllability of shape, and ease of core-shell structure formation. The emulsion aggregation method is described below.

<Emulsion Aggregation Method>

The emulsion aggregation method is a method of forming toner particles in which a dispersion liquid of resin particles dispersed by a surfactant or dispersion stabilizer (hereinafter referred to as "resin particles") is mixed with a dispersion liquid of toner particle components such as colorant particles, and aggregated to the desired toner particle size by adding a coagulant. After that or at the same time as aggregation, fusion between the resin particles is performed to control the shape.

In the present invention, the toner is a magnetic toner, and the magnetic material is mixed with a dispersion liquid of toner particle components to form toner base particles through agglomeration and fusion. Since the magnetic material is black in color, a black magnetic toner may be obtained without adding any colorant. If necessary, a colorant may be added.

The resin particles may be composite particles formed of a plurality of layers having two or more layers made of resins having different compositions.

The resin particles may be manufactured, for example, by an emulsion polymerization method, a mini-emulsion polymerization method, and an inverted-phase emulsification, or by combining several manufacturing methods. When the resin particles contain an internal additive, it is preferable to use the mini-emulsion polymerization method among others.

When the internal additive is contained in the toner base particles, the resin particles may contain the internal additive, or a dispersion liquid of internal additive particles containing only the internal additive may be separately prepared, and the internal additive particles may be aggregated together when the resin particles are aggregated.

The emulsion aggregation method may also be used to obtain toner base particles with a core-shell structure. Specifically, a granular core part is prepared by first aggregating (fusing) the binder resin particles for the core part and the magnetic material. Next, the binder resin particles for the shell layer are added to the dispersion liquid of the core portion, and the binder resin particles for the shell layer are aggregated and fused to the surface of the core portion to form a shell layer that covers the surface of the core portion.

It is preferable that the binder resin according to the present invention contains a crystalline resin and an amorphous resin. When manufacturing toner base particles by the emulsion aggregation method, a preferable embodiment is as follows. The method preferably contains: a step of preparing a crystalline resin particle dispersion liquid, an amorphous resin particle dispersion liquid, and a magnetic material dispersion liquid as a binder resin particle dispersion (hereinafter referred to as a preparation step) (1); and a step of mixing the crystalline resin particle dispersion liquid, the amorphous resin particle dispersion liquid, and the magnetic material dispersion liquid to cause them to aggregate and fuse together (hereinafter referred to as an aggregation-fusion step) (2).

Hereinafter, each step is described in detail.

(1) Preparation Step

The step (1) includes, in more detail, the following: a crystalline resin particle dispersion liquid preparation step, an amorphous resin particle dispersion liquid preparation step, and a magnetic material dispersion liquid preparation step, and, if necessary, this step contains a mold release agent dispersion liquid preparation step, and a colorant dispersion liquid preparation step.

(1-1) Preparation Step of Crystalline Resin Particle Dispersion Liquid and Amorphous Resin Particle Dispersion Liquid The crystalline resin particle dispersion liquid preparation step is a process for synthesizing a crystalline resin that constitutes toner base particles, and dispersing the crystalline resin into a particle form in an aqueous medium to prepare a dispersion liquid of the crystalline resin particles. The amorphous resin particle dispersion liquid preparation step is a process for synthesizing an amorphous resin that constitutes the toner base particles, and dispersing the amorphous resin into a particle form in an aqueous medium to prepare a dispersion liquid of the amorphous resin particles.

As a method of dispersing the crystalline resin in an aqueous medium, the following method may be cited, in which the crystalline resin is dissolved or dispersed in an organic solvent (solvent) to prepare an oil phase liquid, and the oil phase liquid is mixed in the aqueous medium by phase inversion emulsification, then removing the organic solvent after forming oil droplets in a state controlled to a desired particle size. The same applies to the method of dispersing the amorphous resin in an aqueous medium.

As the organic solvent (solvent) used for preparing the oil phase solution, one having a low boiling point and low solubility in water is preferable from the viewpoint of easy removal treatment after formation of oil droplets. Examples thereof include methyl acetate, ethyl acetate, methyl ethyl ketone, isopropyl alcohol, methyl isobutyl ketone, toluene, and xylene. One type of these may be used alone, or two or more may be used in combination.

The amount of the organic solvent used (total amount used when more than one type is used) is preferably in the range of 1 to 300 mass %, more preferably in the range of 10 to 200 mass %, and still more preferably in the range of 25 to 100 mass % of the total mass of the resin.

From the viewpoint of stable and smooth emulsification, it is desirable that the carboxy groups in the oil phase liquid dissociate proton ($H^+$) ions, and it is preferable to add ammonia, or sodium hydroxide to the oil phase liquid in order to promote dissociation.

The amount of the aqueous medium used is preferably in the range of 50 to 2,000 mass % of the total mass of the oil phase liquid. It is more preferable to be in the range of 100 to 1,000 mass %. By using an amount of aqueous medium within the above range, it is possible to emulsify and disperse the oil phase liquid in the aqueous medium to the desired particle size.

A dispersion stabilizer may be dissolved in the aqueous medium, and a surfactant and resin particles may be added for the purpose of improving the dispersion stability of the oil droplets.

Examples of the dispersion stabilizer include inorganic compounds such as tricalcium phosphate, calcium carbonate, titanium oxide, colloidal silica, and hydroxyapatite. From the viewpoint of removing the dispersion stabilizer from the resulting toner base particles, it is preferable to use one that is soluble in acids and alkalis, such as tricalcium phosphate, and from the viewpoint of the environment, it is preferable to use one that may be decomposed by enzymes.

Example of the surfactant include anionic surfactants such as alkylbenzene sulfonate, α-olefin sulfonate, phosphate ester, sodium alkyl diphenyl ether disulfonate, sodium polyoxyethylene lauryl ether sulfate; amine salt types such as alkylamine salt, aminoalcohol fatty acid derivative, polyamine fatty acid derivative, and imidazoline; quaternary ammonium salt type cationic surfactants such as alkyltrimethylammonium salt, dialkyldimethylammonium salt, alkyldimethylbenzylammonium salt, pyridinium salt, alkylisoquinolinium salt, benzethonium chloride; nonionic surfactants such as fatty acid amide derivatives and polyhydric alcohol derivatives; and amphoteric surfactants such as alanine, dodecyldi(aminoethyl)glycine, di(octylaminoethyl)glycine and N-alkyl-N,N-dimethylammonium betaine. Anionic and cationic surfactants with fluoroalkyl groups may also be used.

From the viewpoint of dispersion stability, the resin particles preferably have a particle diameter in the range of 0.5 to 3 μm. Specific examples thereof include polymethylmethacrylate resin particles having a particle diameter of 1 μm and 3 μm, polystyrene resin particles having a particle diameter of 0.5 μm and 2 μm, and polystyrene-acrylonitrile resin particles having a particle diameter of 1 μm.

The emulsification and dispersion of the oil phase liquid may be performed by using mechanical energy. The disperser for emulsifying and dispersing is not particularly limited, and examples thereof include a low-speed shear disperser, a high-speed shear disperser, a friction disperser, and a high-pressure jet disperser, an ultrasonic disperser such as an ultrasonic homogenizer, and a high-pressure impact disperser such as Ultimizer.

The removal of organic solvents after the formation of oil droplets may be performed by gradually raising the temperature of the entire dispersion of crystalline resin particles dispersed in an aqueous medium with stirring, and then desolvate it after giving strong stirring in a certain temperature range. Alternatively, it may be desolvated under reduced pressure using a device such as an evaporator. For the amorphous resin particles, the organic solvent may be removed after the formation of oil droplets in the same way as for the crystalline resin particles described above.

The average particle diameter of the crystalline resin particles (oil droplets) or the amorphous resin particles (oil droplets) in the crystalline resin particle dispersion liquid or the amorphous resin particle dispersion liquid obtained in this way is preferably in the range of 60 to 1,000 nm, and more preferably in the range of 80 to 500 nm. The average particle diameters of resin particles, magnetic material particles, and mold release agent particles are measured using a laser diffraction/scattering particle size analyzer (Microtrac Particle Size Analyzer "UPA-150", manufactured by Nikkiso Co., Ltd.). The average particle size of these resin particles (oil droplets) may be controlled by the amount of mechanical energy used during emulsion dispersion.

The content of the crystalline resin particles or the amorphous resin particles in the crystalline resin particle dispersion liquid or the amorphous resin particle dispersion liquid is preferably in the range of 10 to 50 mass %, and more preferably in the range of 15 to 40 mass % of the total mass of the dispersion. Within the above range, the widening of the particle size distribution may be suppressed and the toner characteristics may be improved.

(1-2) Preparation Step of Magnetic Material Dispersion Liquid

The magnetic material dispersion liquid preparation step is a process to prepare a dispersion liquid of magnetic material particles by dispersing the magnetic material in a particle form in an aqueous medium.

The aqueous medium is as described in (1-1) above, and in this aqueous medium, the surfactants and resin particles shown in (1-1) above may be added to improve dispersion stability.

Dispersion of the magnetic material may be performed using mechanical energy, and such dispersing machines are not limited, and as mentioned above. Examples thereof include a low-speed shear disperser, a high-speed shear disperser, a friction disperser, and a high-pressure jet disperser, ultrasonic dispersers such as an ultrasonic homogenizer, and high-pressure impact dispersers such as Ultimizer.

The content of magnetic material in the magnetic material dispersion liquid is preferably in the range of 35 to 50 mass %, and more preferably in the range of 40 to 50 mass %. By being within the above range, the magnetic attraction with the magnet roll in the developing sleeve becomes appropriate.

(1-3) Preparation Step of Mold Release Agent Particle Dispersion Liquid

The mold release agent particle dispersion liquid preparation step is a process to be carried out as necessary when a mold release agent is desired to be included in the toner base particles, and it is a process to prepare a dispersion liquid of mold release agent particles by dispersing the mold release agent in a particle form in an aqueous medium.

The aqueous medium is as described in (1-1) above, and surfactants and resin particles shown in (1-1) above may be added to this aqueous medium from the viewpoint of dispersion stability.

Dispersion of the mold release agent may be performed using mechanical energy, and such dispersing machines are not limited to any particular type of dispersing machine and as mentioned above, examples include a low-speed shear disperser, a high-speed shear dispersers, a friction disperser, a high-pressure jet dispersers, an ultrasonic disperser such as an ultrasonic homogenizer, a high-pressure impact disperser such as Ultimizer, and a high-pressure homogenizer. In dispersing the mold release agent particles, heating may be performed as necessary.

The content of the mold release agent particles in the dispersion liquid of the mold release agent particles is preferably in the range of 10 to 50 mass %, and more preferably in the range of 15 to 40 mass % of the total mass of the dispersion liquid. By being within the above range, the effect of ensuring hot-offset resistance and separability may be obtained.

(1-4) Preparation Step of Colorant Dispersion Liquid

This colorant dispersion liquid preparation step is a process of preparing a dispersion liquid of colorant particles by dispersing the colorant in a particle form in an aqueous medium.

The aqueous medium is as described in (1-1) above, and surfactants and resin particles shown in (1-1) above may be added to this aqueous medium from the viewpoint of dispersion stability.

Dispersion of the colorant may be performed using mechanical energy, and such dispersing machines are not particularly limited, but as mentioned above, examples include a low-speed shear disperser, a high-speed shear disperser, a friction disperser, a high-pressure jet disperser, an ultrasonic disperser such as an ultrasonic homogenizer, and a high-pressure impact disperser such as Ultimizer.

The content of the colorant in the colorant dispersion liquid is preferably in the range of 10 to 50 mass %, and more preferably in the range of 15 to 40 mass % of the total mass of the dispersion liquid for each color. Being within the above range has the effect of ensuring color reproducibility.

(2) Aggregation-Fusion Step

In this step, the crystalline resin particle dispersion liquid, the amorphous resin particle dispersion liquid, the magnetic material dispersion liquid, and, if necessary, other components such as the mold release agent particle dispersion liquid and the colorant dispersion liquid are mixed. Then, the particles are slowly aggregated while maintaining a balance between the repulsive force of the particle surface due to pH adjustment and the aggregating force of the coagulant consisting of electrolytes. Then, while controlling the average particle size and particle size distribution, the particles are aggregated, and at the same time, by heating and stirring, the particles are fused together to control their shape and form toner particles. This aggregation-fusion step may also be carried out by using mechanical energy or heating means as necessary.

In the aggregation process, first, each of the obtained dispersions liquids is mixed to form a mixed liquid, and it is heated at a temperature below the glass transition temperature of the amorphous resin to aggregate and form aggregated particles. The formation of aggregated particles is carried out by making the pH of the mixed liquid acidic under agitation. The pH is preferably in the range of 2 to 7, more preferably in the range of 2 to 6, and still more preferably in the range of 2 to 5.

In the aggregation process, it is preferable to use a coagulant. The coagulant is not particularly limited, but a surfactant of opposite polarity to the surfactant used for the dispersant, inorganic metal salts, as well as complexes containing divalent metals or more may be suitably used.

Example of the inorganic metal salt include metallic salts such as sodium chloride, potassium chloride, lithium chloride, calcium chloride, barium chloride, magnesium chloride, zinc chloride, aluminum chloride, copper sulfate, magnesium sulfate, aluminum sulfate, manganese sulfate, and calcium nitrate; and inorganic metal salt such as polyaluminum chloride, polyaluminum hydroxide, polysilica iron, and calcium polysulfide. Of these, aluminum salts and polyaluminum chloride are particularly suitable. In order to obtain a sharper particle size distribution, it is more preferable for the inorganic metal salt to have a divalent valence than a monovalent valence, a trivalent valence than a divalent valence, and a tetravalent valence than a trivalent valence.

The content of divalent or higher metal ions in the toner base particles may be controlled mainly by adjusting the pH of the mixing liquid in this process, the content and type of coagulant.

When the aggregated particles have reached the desired particle size, crystalline resin particles and/or amorphous resin particles may be added to produce a toner (particles having a core-shell structure) with a structure in which the surface of the core aggregated particles is coated with a crystalline resin and/or an amorphous resin. In the case of additional addition, an operation such as adding a coagulant or adjusting the pH may be performed before the additional addition.

It is preferable to heat and raise the temperature during the aggregation process. In this case, when the temperature rises above the fusion temperature by heating and raising the temperature, the fusion step will proceed at the same time. The temperature rise rate is preferably in the range of 0.1 to 5° C./min. The heating temperature (peak temperature) is preferably in the range of 40 to 100° C.

The average particle diameter of the aggregated particles is not particularly limited, but it is preferably in the range of 4.5 to 7 μm. When the aggregated particles have reached the desired particle size, an aggregation stopping agent is added to suppress and stop the aggregation of various particles in the reaction system (hereinafter referred to as the aggregation stopping process). The particle size may be controlled by adding an aggregation stopping agent. The aggregation stopping agent is a base compound that may adjust the pH in a direction away from the pH environment where aggregation is promoted. In the aggregation stopping process, it is preferable to adjust the pH of the reaction system to 5 to 9.

Examples of the aggregation stopping agent (base compounds) include ethylenediaminetetraacetic acid (EDTA) and alkali metal salts such as its sodium salt, gluconal, sodium gluconate, potassium citrate and sodium citrate, nitrotriacetate (NTA) salts, GLDA (commercially available L-glutamic acid-N,N-diacetic acid), humic acid and fulvic acid, maltol and ethyl maltol, pentaacetic acid and tetraacetic acid, a known compound having functional groups of both a carboxy group and a hydroxy group such as 3-hydroxy-2,2'-tetrasodium iminodysuccinate or a salt thereof, a water-soluble polymer (polyelectrolyte), sodium hydroxide, and potassium hydroxide. In the aggregation stopping step, stirring may be performed according to the aggregation step.

The fusion step is a process in which each particle constituting the aggregated particles is fused by heating the reaction system to the desired fusion temperature after the above aggregation stopping process or simultaneously with the aggregation process to fuse the aggregated particles to form fused particles.

The fusion temperature in the fusion step is preferably higher than the melting point of the crystalline resin, and the fusion temperature is preferably 0 to 20° C. higher than the melting point of the crystalline resin. The time of heating is preferably done to the extent that fusion is done, and it may be done for 0.5 to 10 hours.

In the aggregation-fusion step, in order to stably disperse each particle in the system, a surfactant may be added to the aqueous medium. This surfactant has the same meaning as the surfactant used in the above (1-1) crystalline resin particle dispersion liquid preparation step/amorphous resin particle dispersion liquid preparation step.

The addition ratio (mass ratio) of amorphous resin particles/crystalline resin particles in the aggregation-fusion step is preferably 1 to 100. By being within the above range, the obtained product has excellent hot-offset resistance and low-temperature fixability.

In the case of introducing other internal additives into the toner base particles, it is preferable to prepare an internal additive particle dispersion liquid containing only the internal additive, and then mix the internal additive particle dispersion liquid together with the crystalline resin particle dispersion liquid, the amorphous resin particle dispersion liquid, and the magnetic material dispersion liquid in the aggregation-fusion step.

After fusion, the fused particles are cooled to obtain the fused particles. The cooling rate is preferably 1 to 20° C./min.

When toner is obtained by the emulsion aggregation method, it is preferable to have a circularity control step (3) to control the circularity of the toner after the above aggregation-fusion step.

(3) Circularity Control Step

The circularity control step specifically includes a heat treatment in which the particles obtained in the aggregation-fusion step are heated. The circularity may be controlled by adjusting the heating temperature and holding time. Increasing the heating temperature or increasing the holding time may bring the circularity closer to 1.

The heating temperature in the circularity control process is preferably in the range of 70 to 95° C. The circularity may be controlled by measuring the circularity of particles with a diameter of 2 μm or more using a circularity measurement device during heating, and determining whether the desired circularity is appropriately achieved or not.

(4) Filtration-Washing Step

The resulting dispersion of toner base particles is cooled, and the toner base particles are solid-liquid separated from the dispersion using a solvent such as water, followed by a filtration process to filter the toner base particles and a washing process to remove surfactants and other adhering substances from the filtered toner base particles (cake-shape aggregate).

The specific method of solid-liquid separation and washing is not limited. Examples include a centrifugation method, a vacuum filtration method using an aspirator and a Nutche, and a filtration method using a filter press. In the filtration-washing process, pH adjustment and grinding may be performed once or repeatedly as appropriate.

(5) Drying Step

The washed toner base particles are dried. The dryer used in the drying process is not particularly limited, but examples include an oven, a spray dryer, a vacuum freeze dryer, a decompression dryer, a static shelf dryer, a mobile shelf dryer, a fluid bed dryer, a rotary dryer, and an agitating dryer. The moisture content in the dried and processed toner base particles, as measured by the Karl Fischer electrodeposition titration method, is preferably 5 mass % or less, and more preferably 2 mass % or less.

When the dried toner base particles are aggregated with weak interparticle attraction to form an aggregate, the aggregate may be subjected to a crushing process. The crushing processing equipment is not particularly limited, and examples include mechanical crushing equipment such as a jet mill, a co-mill, a Henschel mixer, a coffee mill, and a food processor.

(Manufacturing Method of Strontium Titanate)

The manufacturing method of strontium titanate particles according to the present invention is not particularly limited, but from the viewpoint of being able to control the particle size and shape, it is preferable to use a wet manufacturing method. For example, a manufacturing method in which a mixture of titanium dioxide source and strontium source is reacted while adding an alkaline aqueous solution, followed by acid treatment.

In the above production method, strontium titanate particles doped with metal elements other than titanium and strontium may be obtained by adding a dopant source to the mixture of titanium dioxide source and strontium source, or by adding a dopant source at the same time when adding an alkaline aqueous solution.

Furthermore, the particle size of strontium titanate particles may be controlled by the mixing ratio of titanium dioxide and strontium sources, the concentration of titanium dioxide source in the initial stage of reaction, and the addition temperature and rate of alkaline solution.

As the titanium oxide source, it is preferable to use a mineral acid deflocculated product which is a hydrolysis product of a titanium compound. Specifically, it is preferable that metatitanic acid obtained by the sulfuric acid method with a $SO_3$ content of 1.0 mass % or less, preferably 0.5 mass % or less, is deflocculated by hydrochloric acid at a pH of 0.8 to 1.5, from the viewpoint that strontium titanate particles with a good particle size distribution may be obtained.

Example of the strontium source include strontium nitrate and strontium chloride.

The mixing ratio of titanium dioxide source and strontium source is preferably in the range of 0.9 to 1.4, and more preferably in the range of 1.05 to 1.20 in $SrO/TiO_2$ molar ratio. The concentration of titanium dioxide source in the initial stage of the reaction is preferably in the range of 0.05 to 1.3 mol/L, and more preferably in the range of 0.5 to 1.0 mol/L.

As a dopant source, it is preferable to be an oxide of a metal element other than titanium and strontium. The metal oxide as a dopant source is preferably added as a solution dissolved in, for example, nitric acid, hydrochloric acid, or sulfuric acid.

As for the metal element to be doped, it is preferable to be lanthanum, as described above. Dopant sources containing lanthanum include lanthanum nitrate hexahydrate and lanthanum chloride heptahydrate.

The aqueous alkali solution includes, for example, a sodium hydroxide aqueous solution. The addition temperature of the aqueous alkali solution is preferably in the range of 50 to 101° C., because the higher the temperature, the better the crystallinity. Further, the addition rate of the alkaline aqueous solution is preferably in the range of 0.001 to 1.2 equivalents/h with respect to the charged raw material, because the slower the addition rate is, the larger the particle size is, and the faster the addition rate is, the smaller the particle size is. It is more preferably in the range of 0.002 to 1.1 equivalents/h. The addition rate may be changed in the middle depending on the purpose.

In order to prevent the formation of strontium carbonate in the above reaction process, it is preferable to prevent carbon dioxide from entering the reaction, such as by conducting the reaction under a nitrogen gas atmosphere.

After the addition of the alkaline solution, acid treatment may be used to remove the unreacted strontium source. For example, hydrochloric acid is used to adjust the pH of the reaction solution to in the range of 2.5 to 7.0, more preferably 4.5 to 6.0. After acid treatment, the reaction solution is solid-liquid separated and the solids are dried to obtain strontium titanate particles.

The obtained strontium titanate particles may be surface treated as necessary. The method of surface treatment is not particularly limited. For example, in the case of hydrophobized treatment, a treatment solution containing the aforementioned hydrophobized treatment agent and solvent is prepared, and the strontium titanate particles are mixed with the treatment solution under stirring, followed by further stirring. After conducting the surface treatment, a drying process is performed for the purpose of removing the solvent from the treatment solution. The hydrophobizing treatment agent is preferably a silicon-containing organic material as described above, and one type may be used alone, or two or more types may be used in combination.

When the hydrophobizing treatment agent is an alkoxysilane compound or a silazane compound, the solvent used for preparing the treatment liquid is preferably alcohol (for example, methanol, ethanol, propanol, and butanol). When the hydrophobizing treatment agent is silicone oil, hydrocarbons (for example, benzene, toluene, normal hexane, and normal heptane) are preferred.

In the treatment solution, the concentration of the hydrophobizing treatment agent is preferably in the range of 1 to 50 mass %, more preferably in the range of 5 to 40 mass %, and still more preferably in the range of 10 to 30 mass %.

The amount of hydrophobizing agent used for surface treatment may be determined according to the desired volume resistivity. For example, the amount of hydrophobizing agent used is preferably in the range of 1 to 50 parts by mass per 100 parts by mass of strontium titanate particles. More preferably, it is in the range of 5 to 40 parts by mass, and still more preferably, it is in the range of 5 to 30 parts by mass.

The moisture content of strontium titanate particles may be controlled by adjusting the conditions of the drying process after the surface treatment has taken place. The drying conditions are preferably, for example, a drying temperature in the range of 90 to 300° C. (more preferably, in the range of 100 to 150° C.). The drying time is in the range of 1 to 15 hours (more preferably, in the range of 5 to 10 hours).

Alternatively, the hydrophobizing treatment agent may be sprayed on the strontium titanate particles, or the vaporized hydrophobizing treatment agent may be mixed with the particles, and the process may be carried out by heat treatment. Water, amine, or other catalysts may be used in this process, and it is preferable to perform the process under an inert gas atmosphere such as nitrogen.

(External Additive Addition Step)

The toner of the present invention is obtained by adding an external additive containing strontium titanate particles to the toner base particles obtained by the above manufacturing method and adhering it to the surface of the toner base particles. If necessary, an external additive other than strontium titanate particles may be included.

The equipment for mixing the dried toner base particles and the external additive is not particularly limited, and various known mixing equipment such as a turbulence mixer, a Henschel mixer, a Nauta mixer, a V-type mixer, and a sample mill, may be mentioned as examples. In addition, sieve classification may be performed as necessary in order to make the particle size distribution of the toner within an appropriate range.

<<2 Image Forming Method>>

The image forming method of the present invention is characterized by the use of the electrostatic charge image developing toner of the present invention. The toner of the present invention is a magnetic toner and may be used as a one-component developer. Such a one-component developer may be suitably used in a one-component contact development method.

The one-component contact development method is a development method in which a toner carrier and an electrostatic charge image carrier are arranged in contact (in a contacting arrangement), and these carriers convey toner by rotating. Since a large share is applied to the contact area between the toner carrier and the electrostatic charge image carrier, it is desirable for the toner to have high durability and high fluidity in order to obtain high quality images. The toner of the present invention is a toner with excellent durability and may be suitably used in the one-component contact development method.

Compared to the two-component developing method that uses a carrier, the one-component developing method requires less developer because it does not have a carrier, and thus the cartridge that contains the developer may be made smaller. In addition, the contact development method produces high-quality images with less toner splattering. In other words, the single-component contact development method, which combines both of these features, may achieve both miniaturization of the developing device and high image quality.

<<3 Image Forming Apparatus>>

The image forming apparatus of the present invention is an image forming apparatus equipped with an electrostatic charge image holding device, a charging device, an electrostatic charge image forming device, a developing device, a transfer device and a fixing device, and is characterized in that it uses the toner for electrostatic charge image development of the present invention.

Specifically, the image forming apparatus used in the present invention is provided with an electrostatic charge image holding device for holding an electrostatic charge image, a charging device for charging the surface of the electrostatic charge image holder, an electrostatic charge image forming device for forming an electrostatic charge image on the surface of the charged electrostatic charge image holder, a developing device for storing an electrostatic charge image developer and developing the electrostatic charge image formed on the surface of the electrostatic charge image holder by the electrostatic charge image developer as a toner image, and a transfer device for transferring the toner image formed on the surface of the electrostatic charge image holder to the surface of a recording medium, and a fixing device for fixing the toner image transferred on the surface of the recording medium. As the electrostatic charge image developer, the electrostatic charge image developing toner of the present invention is used.

In the image forming apparatus described above, there is an electrostatic charge image holding process that holds an electrostatic charge image, a charging process that charges the surface of the electrostatic charge image holder, an electrostatic charge image forming process that forms an electrostatic charge image on the surface of the charged electrostatic charge image holder, a developing process that contains an electrostatic charge image developer to develop the electrostatic charge image formed on the surface of the electrostatic charge image holder as a toner image by using the electrostatic charge image developer, and a transfer process that transfers the toner image formed on the surface of the electrostatic charge image holder to the surface of a recording medium, and a fixing process that fixes the toner image transferred to the surface of the recording medium.

The image forming apparatus of the present invention may be any one of the following known image forming apparatuses: a direct transfer method apparatus, in which a toner image formed on the surface of an electrostatic charge image holder is directly transferred to a recording medium;

an intermediate transfer method apparatus, in which a toner image formed on the surface of an electrostatic charge image holder is firstly transferred to the surface of an intermediate transfer body, and secondly transferred to the surface of a recording medium; a device equipped with a cleaning means for cleaning the surface of the electrostatic charge image holder after transfer of the toner image and before charging; and a device provided with static elimination means for irradiating the surface of an image holder with static elimination light after transfer of a toner image and before charging.

When the image forming apparatus of the present invention is an intermediate transfer system apparatus, the transfer device may be configured to have the following: an intermediate transfer body on which a toner image is transferred to the surface, a primary transfer device for primary transfer of the toner image formed on the surface of the electrostatic charge image holder to the surface of the intermediate transfer body, and a secondary transfer device for secondary transfer of the toner image transferred to the surface of the intermediate transfer body to the surface of the recording medium.

In the image forming apparatus of the present invention, for example, the portion including the developing device may be a cartridge structure (process cartridge) that is attached to and detached from the image forming apparatus. As a process cartridge, for example, a process cartridge equipped with a developing device containing the electrostatic charge image developing toner of the present invention is suitably used.

Hereinafter, the one-component contact developing method that may be suitably used in the image forming apparatus of the present invention will be described in detail with reference to the drawings.

Figure 2:
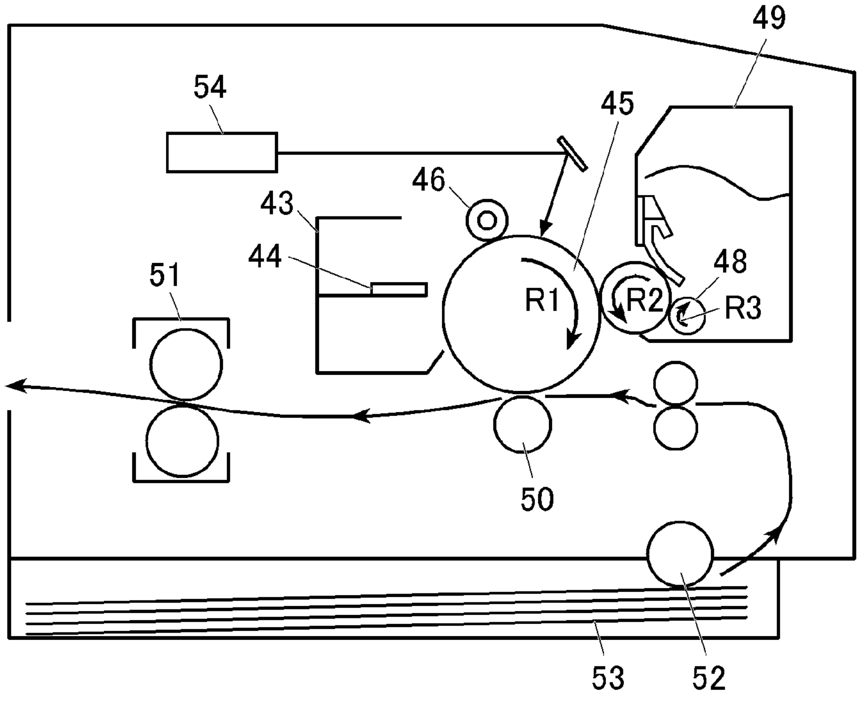
FIG. 2 is a schematic cross-sectional view showing an example of a one-component contact development type image forming apparatus.

FIG. 1 is a schematic cross-sectional view of an example of a developing device. FIG. 2 is a schematic cross-sectional view of an example of an image forming apparatus with a single-component contact development method.

In FIG. 1 or FIG. 2, the electrostatic charge image carrier 45, on which the electrostatic charge image is formed, is rotated in the direction of arrow R1. The toner carrier 47 rotates in the direction of the arrow R2 to transport the toner 57 to the development area where the toner carrier 47 and the electrostatic charge image carrier 445 are facing each other. Also, the toner supply member 48 is in contact with the toner carrier 47, and by rotating in the direction of arrow R3, it supplies toner 57 to the surface of the toner carrier 47. The toner 57 is supplied to the surface of the toner carrier 47 by rotating in the direction of arrow R3. The toner 57 is also agitated by the agitating member 58.

The electrostatic charge image carrier 45 is surrounded by a charging member (charging roller) 46, a transfer member (transfer roller) 50, a cleaner container 43, cleaning blade 44, fixing device 51, and pickup roller 52. The electrostatic charge image carrier 45 is charged by the charging roller 46. Then, exposure is performed by irradiating laser light onto the static charge image carrier 45 by the laser generator 54, and electrostatic charges corresponding to the desired image are formed.

The electrostatic charge image on the electrostatic charge image carrier 45 is developed by the toner 57 in the developing device 49 to obtain a toner image. The toner image is transferred onto the transfer material (paper) 53 by the transfer member (transfer roller) 50 which is in contact with the electrostatic charge image carrier 45 via the transfer material. The transfer of the toner image to the transfer material may be performed via an intermediate transfer material. The transfer material (paper) 53 carrying the toner image is transported to the fixing device 51 to be fixed on the transfer material (paper) 53. The toner 57 that is partially left on the electrostatic charge image carrier 45 is scraped off by the cleaning blade 44 and stored in the cleaner container 43. The toner is then stored in the cleaner container 43. Further, it is preferable that the toner regulating member (reference numeral 55 in FIG. 1) abuts on the toner carrier via the toner to regulate the toner layer thickness on the toner carrier. In this way, it is possible to obtain high image quality with no defective regulation. A regulation blade is commonly used as a toner regulating member that comes in contact with the toner carrier.

It is preferable that the base portion on the upper side of the regulation blade is fixedly held on the developing device side, the lower side is bent in the forward or reverse direction of the toner carrier against the elastic force of the blade to bend the surface of the toner carrier to contact the surface of the toner carrier with an appropriate elastic pressing force. For example, fixing the toner regulating member 55 to the developing device is preferably done as shown in FIG. 1. That is, one free end of the toner regulating member 55 may be sandwiched between two fixing members (for example, a metal elastic body, reference numeral 56 in FIG. 1) and fixed by screwing.

EXAMPLES

Hereinafter, the present invention will be specifically described with reference to examples, but the present invention is not limited thereto. In addition, although the description of "parts" or "%" is used in the examples, it represents "parts by mass" or "mass %" unless otherwise specified.

Example 1

Toner particles 1 to 13 were prepared according to the procedures described below, and each toner was evaluated.

[Preparation of Toner Base Particles 1 to 4]

<Preparation of Toner Base Particles 1>

(Synthesis of Amorphous Polyester A1)

Terephthalic acid: 48.0 parts by mass
Dodecenylsuccinic acid: 17.0 parts by mass
Trimellitic acid: 10.2 parts by mass
Bisphenol A ethylene oxide (2 mol) adduct: 80.0 parts by mass
Bisphenol A propylene oxide (2 mol) adduct: 74.0 parts by mass
Dibutyltin oxide: 0.1 parts by mass The above materials were placed in a heated and dried two-necked flask, and nitrogen gas was introduced into the vessel to maintain an inert atmosphere, and the temperature was raised while stirring. Then, the condensation polymerization reaction was carried out at 150° C. to 230° C. for about 13 hours, then by gradually reducing the pressure at 210° C. to 250° C., an amorphous polyester A1 was obtained.

The number average molecular weight (Mn) of the amorphous polyester A1 is 21,200, the weight average molecular weight (Mw) was 98,000, and the glass transition temperature (Tg) was 58.3° C.

(Preparation of Resin Dissolving Solution)

Ethyl acetate: 100.0 parts by mass
Amorphous polyester A1: 30.0 parts by mass
Sodium hydroxide (0.1 mol/L): 0.3 parts by mass
Anionic surfactant (NEOGEN RK, manufactured by Daiichi Kogyo Seiyaku Co., Ltd.): 0.2 parts by mass The above materials were put into a beaker equipped with a stirrer, heated to 60.0° C., and continued stirring until completely dissolved to obtain a resin dissolving solution A1.

(Preparation of Amorphous Resin Particle Dispersion Liquid A1)

While further stirring the resin dissolving solution A1, 90.0 parts by mass of ion-exchanged water was gradually added to the solution, and the solution was inverted-phase emulsified and desolvated to obtain an amorphous resin particle dispersion liquid A1 (solid content concentration: 25 mass %) containing an amorphous polyester resin. The volume average particle diameter of the resin particles in the amorphous resin particle dispersion liquid A1 was 0.19 μm.

(Synthesis of Crystalline Polyester C1)

1,10-Decanedicarboxylic acid: 230.0 parts by mass 1,9-Nonanediol: 168.0 parts by mass Dibutyltin oxide: 0.1 parts by mass The above materials were placed in a heated and dried two-necked flask, and the temperature was raised while maintaining an inert atmosphere by introducing nitrogen gas into the vessel and stirring. The mixture was then stirred at 170° C. for 6 hours. After that, the temperature was gradually raised to 230° C. under reduced pressure while continuing to stir, and the mixture was maintained for another 3 hours. When it became viscous, the reaction was stopped by air cooling to synthesize a crystalline polyester C1. The weight average molecular weight (Mw) of the crystalline polyester C1 was 36,700, and the melting point was 73.0° C.

(Preparation of Crystalline Resin Particle Dispersion Liquid C1)

In the preparation of the amorphous resin particle dispersion liquid A1, the crystalline resin particle dispersion liquid C1 containing the crystalline polyester resin (solid content concentration: 25.0 mass %) was similarly obtained except that the resin used was a crystalline polyester C1. The volume average particle diameter of the resin particles in the crystalline resin particle dispersion liquid C1 was 0.19 μm.

(Preparation of Wax Dispersion Liquid W1)

Behenyl Behenate: 50.0 parts by mass

Anionic surfactant (NEOGEN RK, manufactured by Daiichi Kogyo Seiyaku Co., Ltd.): 0.3 parts by mass Ion-exchanged water: 150.0 parts by mass The above materials were mixed, heated to 95° C., and the mixture was dispersed using a homogenizer (ULTRATALUX T50, manufactured by IKA Corporation). Then, the dispersion was processed using a Manton-Golin high-pressure homogenizer (manufactured by Golin Corporation) to obtain a wax dispersion liquid W1 (solid concentration: 25.0 mass %). The volume average particle diameter of the wax particles in the wax dispersion liquid W1 was 0.22 μm. In addition, Behenyl behenate is a mold release agent, and its melting point is 73° C.

(Preparation of Magnetic Material M1)

50 liters of a ferrous sulfate aqueous solution containing 2.0 mol/L of $Fe^{2+}$ was mixed and stirred with 55 liters of a 4.0 mol/L sodium hydroxide aqueous solution to obtain a ferrous salt aqueous solution containing a ferrous hydroxide colloid. This aqueous solution was kept at 85° C. and an oxidation reaction was carried out while blowing air at 20.0 L/min to obtain a slurry containing core particles.

The resulting slurry was filtered and washed using a filter press, and then the core particles were dispersed again in water. To the resulting slurry solution, sodium silicate was added at a rate of 0.20 mass % (silicon equivalent) of the total mass of the core particles, and the pH of the slurry solution was adjusted to 6.0 and stirred to obtain magnetic iron oxide particles with a silicon rich surface.

The resulting slurry solution was filtered through a filter press, washed, and then it was made into a slurry again with ion-exchanged water. 500.0 parts by mass (10.0 mass % with respect to magnetic iron oxide) of the ion-exchange resin SK110 (manufactured by Mitsubishi Chemical Corporation) was added to this re-slurry liquid (solid content: 50.0 parts by mass/L). Ion exchange was performed with stirring for 2 hours. After that, the ion-exchange resin was removed by filtering through a mesh, filtered and washed through a filter press, dried, and crushed to obtain a magnetic material M1 with a number average primary particle diameter of 0.21 μm.

(Preparation of Magnetic Material Dispersion Liquid M1)

Magnetic material M1: 25.0 parts by mass

Ion-exchanged water: 75.0 parts by mass

The above materials were mixed and dispersed using a homogenizer (ULTRATALUX T50, manufactured by IKA Corporation) at 8000 rpm for 10 minutes to obtain a magnetic material dispersion liquid ML. The volume average particle diameter of the magnetic material in the magnetic material dispersion liquid was 0.23 μm.

(Preparation of Toner Base Particle Dispersion Liquid 1)

Amorphous resin particle dispersion liquid A1 (solid content concentration: 25.0 mass %): 150.0 parts by mass Crystalline resin particle dispersion liquid C1 (solid content concentration: 25.0 mass %): 45.0 parts by mass Wax dispersion liquid W1 (solid concentration: 25.0 mass %): 15.0 parts by mass Magnetic material dispersion liquid M1 (solid concentration: 25.0 mass %): 105.0 pats by mass After the above materials were put into a beaker and prepared so that the total number of mass parts of water was 250 parts by mass, the temperature was adjusted to 30.0° C. The mixture was then mixed by using a homogenizer (ULTRATALUX T50, manufactured by IKA Corporation) by stirring at 5,000 rpm for 1 minute. In addition, 10.0 parts by mass of magnesium sulfate 2.0 mass % solution was gradually added as a coagulant. The raw material dispersion was transferred to a polymerization vessel equipped with a stirrer and a thermometer, and heated to 50.0° C. with a mantle heater and stirred to promote the growth of aggregated particles. After 60 minutes, 200.0 parts by mass of an aqueous solution of 5.0 mass % EDTA was added to prepare a dispersion liquid of aggregated particles. Subsequently, the aggregated particle dispersion was adjusted to pH 8.0 using a 0.1 mol/L sodium hydroxide aqueous solution, and then the aggregated particle dispersion 1 was heated to 80.0° C., and left for 180 minutes to coalescence the aggregated particles. After 180 minutes, toner base particle dispersion liquid 1 was obtained in which the toner base particles were dispersed.

(Preparation of Toner Base Particles 1)

Toner base particle dispersion liquid 1 was cooled down to 40° C. or lower at a rate of 300° C./min, filtered, and washed through with ion-exchanged water. When the conductivity of the filtrate became less than 50 mS/m, the toner base particles in a cake-shape were taken out.

Then, the cake-shaped toner base particles were put into ion-exchanged water having an amount of 20 times the mass of the toner base particles. It was stirred with a three-one motor, and when the toner base particles were sufficiently loosened, they were filtered again, washed through water, and separated into solid and liquid. The resulting cake-shape toner base particles were crushed in a sample mill and dried in an oven at 40° C. for 24 hours. After further crushing the obtained powder in a sample mill, toner base particles 1 were obtained by additional vacuum drying in an oven at 50° C. for 5 hours.

<Preparation of Toner Base Particles 2>

(Preparation of Amorphous Resin Particle Dispersion Liquid B1)

(1) First Stage Polymerization

A 5 L reaction vessel equipped with a stirrer, a temperature sensor, a cooling pipe, and a nitrogen introduction device was charged with 8.0 parts by mass of sodium dodecyl sulfate and 3,000 parts by mass of ion-exchanged water. The internal temperature of the reaction vessel was raised to 80° C. while stirring at a stirring speed of 230 rpm. After the temperature was raised, an aqueous solution of 10.0 parts by mass of potassium persulfate dissolved in 200 parts by mass of ion-exchanged water was added to the resulting mixture, and the temperature of the resulting mixture was raised to 80° C. again. After dropping monomer mixture 1 containing the following composition into the mixture over a period of 1 hour, polymerization was carried out by heating and stirring the mixture at 80° C. for 2 hours. A dispersion liquid of resin particles (b1) was prepared.

(Monomer Mixture Solution 1)

Styrene: 480.0 parts by mass
n-Butyl acrylate: 250.0 parts by mass
Methacrylic acid: 68.0 parts by mass (2) Second Stage Polymerization A 5 L reaction vessel equipped with a stirrer, a temperature sensor, a cooling pipe, and a nitrogen introduction device was charged with a solution prepared by 7.0 parts by mass of sodium polyoxyethylene (2) dodecyl ether sulfate dissolved in 3,000 parts by mass of ion-exchanged water. After heating the solution to 80° C., 80.0 parts by mass of the dispersion liquid of resin particles (b1) (solid content equivalent) and a monomer mixture 2 in which monomers and a mold release agent containing the following composition were dissolved at 90° C. was added. The mixture was mixed and dispersed for 1 hour by CLEARMIX™ (manufactured by M Technique Co., Ltd.). A dispersion liquid containing emulsified particles (oil droplets) was obtained.

(Monomer Mixture Solution 2)

Styrene: 285.0 parts by mass
n-Butyl acrylate: 95.0 parts by mass
Methacrylic acid: 20.0 parts by mass
n-octyl-3-mercaptopropionate: 8.0 parts by mass
Behenyl Behenate: 190.0 parts by mass Then, a polymerization initiator solution containing 6.0 parts by mass of potassium persulfate dissolved in 200.0 parts by mass of ion-exchanged water was added to this dispersion liquid. The resulting dispersion liquid was heated and stirred at 84° C. for 1 hour to polymerize and obtain a dispersion liquid of resin particles (b2).

(3) Third Stage Polymerization

Furthermore, 400.0 parts by mass of ion-exchanged water was added to the dispersion liquid of resin particles (b2). After thoroughly mixing, a solution of 11.0 parts by mass of potassium persulfate dissolved in 400.0 parts by mass of ion-exchanged water was added to the resulting dispersion liquid. Under the temperature condition of 82° C., a monomer mixture 3 containing the following composition was added dropwise over a period of 1 hour. After completion of the drop, the dispersion liquid was heated and stirred for 2 hours to polymerize, and then cooled to 28° C. to obtain a dispersion liquid of amorphous resin particles containing a vinyl resin (styrene-acrylic resin) B1.

(Monomer Mixture Solution 3)

Styrene: 307.0 parts by mass
n-Butyl acrylate 147.0 parts by mass
Methacrylic acid: 52.0 parts by mass
n-Octyl-3-mercaptopropionate: 8.0 parts by mass (Preparation of Toner Base Particle Dispersion Liquid 2)

A reaction vessel equipped with a stirrer, a temperature sensor, and a cooling pipe was charged with 288.0 parts by mass of the amorphous resin particle dispersion liquid (B1) (solid content equivalent) and 2,000.0 parts by mass of ion-exchanged water. Then a 5 mol/L of sodium hydroxide aqueous solution was added to the mixture to make the pH 10 (measurement temperature: 25° C.). Further, 150.0 parts by mass of the magnetic material dispersion liquid M1 (solid content equivalent) was added to obtain a toner base particle dispersion liquid 2.

(Preparation of Toner Base Particles 2)

An aqueous solution of 30.0 mass parts of magnesium chloride as a coagulant dissolved in 60.0 mass parts of ion-exchanged water was added to the dispersion liquid over a period of 10 minutes at 30° C. under stirring. The resulting mixture was heated up to 80° C., and 75.0 parts by mass of the crystalline resin particle dispersion liquid C1 (solid content equivalent) was added to the mixture over 10 minutes to proceed aggregation.

Using Coulter Multisizer 3 (manufactured by Beckman Coulter Corporation), the particle size of the particles that had aggregated in the mixture was measured. When the median diameter d50 of the particles on a volume basis was 6.0 μm, an aqueous solution of 190.0 mass of sodium chloride dissolved in 760.0 mass of ion-exchanged water was added to stop the particle growth. Furthermore, the mixture was heated to 80° C. and stirred to progress the fusion of the particles.

Then, the toner particles were measured using an average circularity measurement system FPIA-3000 (manufactured by Sysmex Corporation) to measure an average circularity of the toner particles (HPF detection: 4,000 units). When the average circularity reached 957, the mixture was cooled to 30° C. at a cooling rate of 5° C./min.

Then, the toner cake was solid-liquid separated, the dehydrated toner cake was dispersed again in ion-exchange water and washed by repeating the solid-liquid separation process three times, and then dried at 40° C. for 24 hours. The toner base particles 2 were thus obtained.

<Preparation of Toner Base Particles 3>

(Preparation of Colorant Particle Dispersion Liquid)

90.0 parts by mass of sodium dodecyl sulfate was stirred and dissolved in 1600.0 parts by mass of ion-exchanged water. While stirring this solution, 420.0 mass of carbon black Regal 330R (manufactured by Cabot Corporation) was gradually added. Then, a dispersion liquid of colorant particles was obtained by dispersing using a stirrer CLEARMIX (manufactured by M Technique Co., Ltd.). The particle diameter of the colorant particles in the colorant particle dispersion liquid was measured using a particle size analyzer Nanotrack Wave (manufactured by MicrotracBEL Corp.), and the particle diameter was 117.0 nm.

<Preparation of Toner Base Particles 3>

(Preparation of Toner Base Particle Dispersion Liquid 3)

Amorphous resin particle dispersion liquid A1 (solid content: 25.0 mass %): 45.0 parts by mass
Amorphous resin particle dispersion liquid B1 (solid content: 25.0 mass %): 150.0 parts by mass
Wax dispersion liquid W1 (solid content: 25.0 mass %): 15.0 parts by mass Magnetic material dispersion liquid M1 (solid content: 25.0 mass %): 105.0 parts by mass Toner base particle dispersion liquid 3 was obtained in the same manner as production of the toner base particle dispersion liquid 1 except that the materials used were changed to the above materials. Then, the same process as that for making toner base particle 1 was carried out to obtain toner base particle 3.

<Preparation of Toner Base Particles 4>

(Preparation of Crystalline Resin Particle Dispersion Liquid C2)

Isophorone diisocyanate: 1,000.0 parts by mass 1,4-Adipate (polyester diol composed of 1,4-butanediol and adipic acid): 830.0 parts by mass Stearic acid: 96.3 parts by mass Methyl ethyl ketone: 250.00 parts by mass The above materials were fed into a reaction device equipped with a stirrer and a thermometer, while nitrogen was introduced. Then, urethane reaction was carried out at 80° C. for 6 hours. Next, 2,128.0 parts by mass of ion-exchanged water were added while stirring. Then the reaction system was desolvated under reduced pressure to obtain a crystalline resin particle dispersion liquid containing a crystalline polyurethane resin C2.

Toner base particle dispersion liquid 4 was obtained in the same way as production of the toner base particle dispersion liquid 1 except that the material used was changed to crystalline resin particle dispersion liquid C2 instead of the crystalline resin particle dispersion liquid C1. Then, the same process as for the preparation of toner base particles 1 was carried out to obtain toner base particles 4.

[Preparation of External Additives 1 to 9]

<Preparation of External Additives 1 to 9 (Strontium Titanate TS-1 to 9)>

(Preparation of Strontium Titanate TS-4)

The metatitanic acid obtained by the sulfuric acid method was de-iron bleached. Then a sodium hydroxide aqueous solution was added to adjust the pH to 9.0, desulfurization treatment was performed, and then the mixture was neutralized to pH 5.8 with hydrochloric acid and filtered and washed with water. Water was added to the washed cake to make a slurry of 1.85 mol/L as $TiO_2$, and then hydrochloric acid was added to adjust the pH to 1.0, and the cake was deflocculated. The metatitanic acid was used as $TiO_2$. 0.625 mol of this metatitanic acid was collected as $TiO_2$ and charged into a 3 L reaction vessel. Further, 0.719 mol of an aqueous solution of strontium chloride and an aqueous solution of lanthanum chloride were added so as to have a mol ratio of SrO/LaO/$TiO_2$ to be 1.00/0.18/1.00. Then, the $TiO_2$ concentration was adjusted to 0.313 mol/L. Next, the temperature was increased to 90° C. while stirring and mixing, and then 296 mL of 5 mol/L sodium hydroxide aqueous solution was added over 18 hours. The reaction was terminated by continued stirring at 95° C. for 1 hour.

The reaction slurry was cooled to 50° C., and hydrochloric acid was added until it reached pH 5.0, and stirring was continued for 1 hour. The precipitate obtained was washed by decantation, hydrochloric acid was added to the slurry containing the precipitate to pH 6.5.

9.0 mass % of isobutyltrimethoxysilane to the solid content was added, and stirring was continued for 1 hour. Then, the cake was filtered and washed, and dried in air at 120° C. for 8 hours to obtain strontium titanate TS-4.

(Preparation of Strontium Titanate TS-1 to TS-3 and TS-5 to TS-7)

Strontium titanate TS-1 to TS-3 and TS-5 to TS-7 were prepared in the same way as preparation of strontium titanate TS-4 except that the preparation conditions were changed to those listed in Table I.

TABLE I

| Strontium titanate No. | SrO/LaO/$TiO_2$ mol ratio | Sodium hydroxide aqueous solution Addition time [hour] |
|---|---|---|
| TS-1 | 1.00/0.18/1.00 | 10 |
| TS-2 | 1.00/0.75/1.00 | 10 |
| TS-3 | 1.00/0.05/1.00 | 10 |
| TS-4 | 1.00/0.18/1.00 | 18 |
| TS-5 | 1.00/0.18/1.00 | 4 |
| TS-6 | 1.00/0.18/1.00 | 20 |
| TS-7 | 1.00/0.18/1.00 | 50 |

(Preparation of Strontium Titanate TS-8)

Strontium titanate TS-8 was obtained in the same way as preparation of strontium titanate TS-4, except that the mol ratio of SrO/LaO/$TiO_2$ was changed to 1.00/0.00/1.00.

(Preparation of Strontium Titanate TS-9)

Strontium titanate TS-9 was obtained in the same way as preparation of strontium titanate TS-4, except that the lanthanum chloride solution was changed to the manganese chloride solution.

[External Additive 10 (Silica)]

As the external additive 10, "NAX50" (manufactured by AEROSIL Corporation) was used.

<Various Measurements>

The number average primary particle diameter and average circularity of the obtained strontium titanate TS-1 to TS-9 were measured by the above measuring method. The results obtained are shown in Table II.

[Preparation of Toner Particles 1 to 13]

In the combination shown in Table II, 0.95 parts by mass of an external additive was added to 100 parts by mass of the toner base particles, and the mixture was mixed with a Henschel mixer at a stirring peripheral speed of 30 m/sec for 15 minutes to obtain toner particles 1 to 13.

In Table II, CPES means crystalline polyester, APES means amorphous polyester, St-Ac means vinyl resin, and PU means crystalline polyurethane.

[Evaluation]

The obtained toner particles 1 to 13 were evaluated as follows using a one-component contact developing method LaserJet Pro M12 (manufactured by Hewlett-Packard Co., Ltd.) in an environment of 30° C. and 80 n % RH. The results are shown in Table II. In each evaluation, the ranking of AA and BB were judged as acceptable, and the ranking CC was unacceptable.

(1) Low-Temperature Fixing Property

A solid image having a toner adhesion amount of 11.3 g/m2 and a size of 100 mm×100 mm was formed on A4 size high-quality paper (NPI high-quality, basis weight: 127.9 $g/m^2$, manufactured by Nippon Paper Industries, Ltd.). At this time, the temperature of the fixing roller was raised from 110° C. to 180° C. in 2° C. increments to repeatedly form an image. Then, the lowest fixing temperature at which the image stain due to the fixing offset was not visually confirmed was set as the lowest fixing temperature (U.O. avoidance temperature), and the low temperature fixing property was evaluated according to the following criteria.

AA: Lowest fixing temperature is less than 175° C.

BB: Lowest fixing temperature is 175° C. or higher and less than 185° C.

CC: Lowest fixing temperature is 185° C. or higher.

(2) Fog

The absolute image density of the unprinted white paper was measured at 20 locations using Macbeth reflectance densitometer RD907 (manufactured by Macbeth, Inc.). Next, the absolute image density of the white area of the evaluated image was measured in the same way at 20 locations, averaged, and the value obtained by subtracting the blank paper density from the average density was evaluated as the fog density.

AA: Fog density is less than 0.007.

BB: Fog density is 0.007 or more and less than 0.010.

CC: Fog density is 0.010 or more.

(3) Image Density Stability

Before and after printing 1 million sheets, a 40% flat screen image was output on an A4-size fine paper "CF paper; basis weight: 80.0 g/m$^2$, manufactured by Konica Minolta, Inc.". The reflection density of the obtained image was measured by Macbeth reflection densitometer RD907 (manufactured by Macbeth, Inc.). The difference in reflectance density of the halftone image before and after printing 1 million images was determined.

AA: Absolute value of reflection density difference is 0.03 or less.

BB: Absolute value of the difference in reflection density is more than 0.03 and less than 0.06.

CC: Absolute value of the difference in reflection density is 0.06 or more.

Although embodiments of the present invention have been described and illustrated in detail, the disclosed embodiments are made for purposes of illustration and example only and not limitation. The scope of the present invention should be interpreted by terms of the appended claims.

DESCRIPTION OF SYMBOLS

43: Cleaner container
44: Cleaning blade
45: Electrostatic charge image carrier
46: Charging roller
47: Toner carrier
48: Toner supply member
49: Developing device
50: Transfer member (transfer roller)
51: Fixing device
52: Pickup roller
53: Transfer material
54: Laser generator
55: Toner regulating member
56: Fixing member
57: Toner
58: agitating member
R1 to R3: Rotation direction

TABLE II

| Toner particles No. | Toner composition: Toner base particles: Binder resin No. | Crystalline resin | Amorphous resin | External additive No. | Type | Dopant | Number average primary particle diameter [nm] | Evaluation: Average circularity | *1 | Fog | Image stability | Remarks |
|---|---|---|---|---|---|---|---|---|---|---|---|---|
| 1 | 1 | CPES | APES | 1 | TS-1 | La | 30 | 0.85 | AA | AA | AA | Inventive Example |
| 2 | 1 | CPES | APES | 4 | TS-4 | La | 100 | 0.85 | AA | AA | AA | Inventive Example |
| 3 | 2 | CPES | St-Ac | 1 | TS-1 | La | 30 | 0.85 | AA | AA | AA | Inventive Example |
| 4 | 4 | PU | APES | 1 | TS-1 | La | 30 | 0.85 | BB | AA | AA | Inventive Example |
| 5 | 1 | CPES | APES | 2 | TS-2 | La | 30 | 0.95 | AA | AA | BB | Inventive Example |
| 6 | 1 | CPES | APES | 3 | TS-3 | La | 30 | 0.81 | AA | AA | BB | Inventive Example |
| 7 | 1 | CPES | APES | 6 | TS-6 | La | 110 | 0.85 | AA | AA | BB | Inventive Example |
| 8 | 1 | CPES | APES | 7 | TS-7 | La | 310 | 0.85 | AA | BB | BB | Inventive Example |
| 9 | 1 | CPES | APES | 5 | TS-5 | La | 8 | 0.85 | AA | BB | BB | Inventive Example |
| 10 | 1 | CPES | APES | 9 | TS-9 | Mn | 50 | 0.84 | BB | BB | BB | Inventive Example |
| 11 | 1 | CPES | APES | 8 | TS-8 | — | 30 | 0.75 | BB | BB | CC | Comparative Example |
| 12 | 1 | CPES | APES | 10 | Silica | — | — | — | BB | X | CC | Comparative Example |
| 13 | 3 | — | St-Ac/APES | 1 | TS-1 | La | 30 | 0.85 | CC | BB | CC | Comparative Example |

*1: Low-temperature fixability

From the results in Table II, it can be seen that the electrostatic charge image developing toner of the present invention has improved low-temperature fixability, fog suppression and image stability. From this, the electrostatic charge image developing toner of the present invention has improved low-temperature fixability and fog suppression, and has durability. Therefore, it is considered that even if the magnetic material is used for a long period of time, exposure of the magnetic material on the surface of the toner particles is reduced, and the charge attenuation caused by the exposure is suppressed, and as a result, the image density stability is improved.

It can also be seen that by adjusting the number average primary particle diameter and average circularity of the electrostatic charge image developing toner within a suitable range, it is possible to achieve both low-temperature fixability, fog suppression and durability.

What is claimed is:

1. An electrostatic charge image developing toner comprising: toner base particles containing at least a binder resin and a magnetic material; and an external additive, wherein the binder resin contains a crystalline resin and a hybrid amorphous polyester resin, the external additive contains strontium titanate particles doped with metal elements other than titanium and strontium, and a content of the magnetic material is in a range of 35 to 50 mass % based on a total mass of the toner base particles.

2. The electrostatic charge image developing toner according to claim 1, wherein the strontium titanate particles are doped with lanthanum.

3. The electrostatic charge image developing toner according to claim 1, wherein a number average primary particle dimeter of the strontium titanate particles is in the range of 20 to 300 nm.

4. The electrostatic charge image developing toner according to claim 1, wherein a number average primary particle dimeter of the strontium titanate particles is in the range of 20 to 100 nm.

5. The electrostatic charge image developing toner according to claim 1, wherein an average circularity of primary particles of the strontium titanate particles is in the range of 0.82 to 0.94.

6. The electrostatic charge image developing toner according to claim 1, wherein the crystalline resin is made of crystalline polyester.

7. An image forming method comprising the step of forming an image using the electrostatic charge image developing toner according to claim 1.

8. The electrostatic charge image developing toner according to claim 1, wherein the metal elements other than titanium and strontium are at least one element selected from the group consisting of cerium, aluminum, calcium, magnesium, barium, phosphorus, sulfur, vanadium, chromium, manganese, iron, cobalt, nickel, copper, gallium, yttrium, zinc, niobium, molybdenum, ruthenium, rhodium, palladium, silver, indium, tin, antimony, tantalum, tungsten, rhenium, osmium, iridium, platinum, bismuth, zirconium, and tin.

9. The electrostatic charge image developing toner according to claim 1, wherein the toner base particles further contain a magenta colorant, a red colorant, an orange colorant, a yellow colorant, a green colorant, or a cyan colorant.

10. The electrostatic charge image developing toner according to claim 1, wherein the toner base particles have a core/shell structure, in which a core comprises the crystalline resin, and a shell comprises the hybrid amorphous polyester resin.

* * * * *